(12) United States Patent
Tsunekawa

(10) Patent No.: US 8,102,308 B2
(45) Date of Patent: Jan. 24, 2012

(54) RADAR APPARATUS, AND MEASUREMENT METHOD USED IN THE RADAR APPARATUS

(75) Inventor: Jun Tsunekawa, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 3 days.

(21) Appl. No.: 13/077,126

(22) Filed: Mar. 31, 2011

(65) Prior Publication Data

US 2011/0175767 A1   Jul. 21, 2011

Related U.S. Application Data

(63) Continuation of application No. PCT/JP2008/03895, filed on Dec. 22, 2008.

(51) Int. Cl.
*G01S 13/58* (2006.01)

(52) U.S. Cl. ........ 342/107; 342/104; 342/113; 342/118; 342/133; 342/147

(58) Field of Classification Search .................. 342/104, 342/107, 113, 118, 133, 139, 146, 147
See application file for complete search history.

(56) References Cited

U.S. PATENT DOCUMENTS

2008/0172156 A1* 7/2008 Joh et al. ...................... 701/45

FOREIGN PATENT DOCUMENTS

| JP | 7-20239 | 1/1995 |
|----|---------|--------|
| JP | 8-86861 | 4/1996 |
| JP | 9-243300 | 9/1997 |
| JP | 2001-242242 | 9/2001 |
| JP | 2005-10092 | 1/2005 |
| JP | 2006-275828 | 10/2006 |
| JP | 2006-284120 | 10/2006 |

OTHER PUBLICATIONS

Japanese International Search Report mailed Feb. 10, 2009 in PCT/JP2008/003895 filed Dec. 22, 2008 in English.
Japanese Written Opinion mailed Feb. 10, 2009 in PCT/JP2008/003895 filed Dec. 22, 2008.

* cited by examiner

*Primary Examiner* — Timothy A Brainard
(74) *Attorney, Agent, or Firm* — Oblon, Spivak, McClelland, Maier & Neustadt, L.L.P.

(57) ABSTRACT

The present invention provides a radar apparatus capable of changing a characteristic of filter processing while considering also a relative velocity of an object. A measurement section measures a relative position and a relative velocity of an object such as another vehicle, a pedestrian, and an object placed on a road. The radar apparatus calculates a time until the object and an own vehicle collide with each other, based on the relative position and relative velocity of the object measured by the measurement section, and changes, based on the calculated time, a filter coefficient to be used when filter processing is performed on a measured position converted from the measured relative position of the object, thereby changing a characteristic of the filter processing to be performed on the measured position, between stability and responsiveness.

7 Claims, 10 Drawing Sheets

F I G. 3
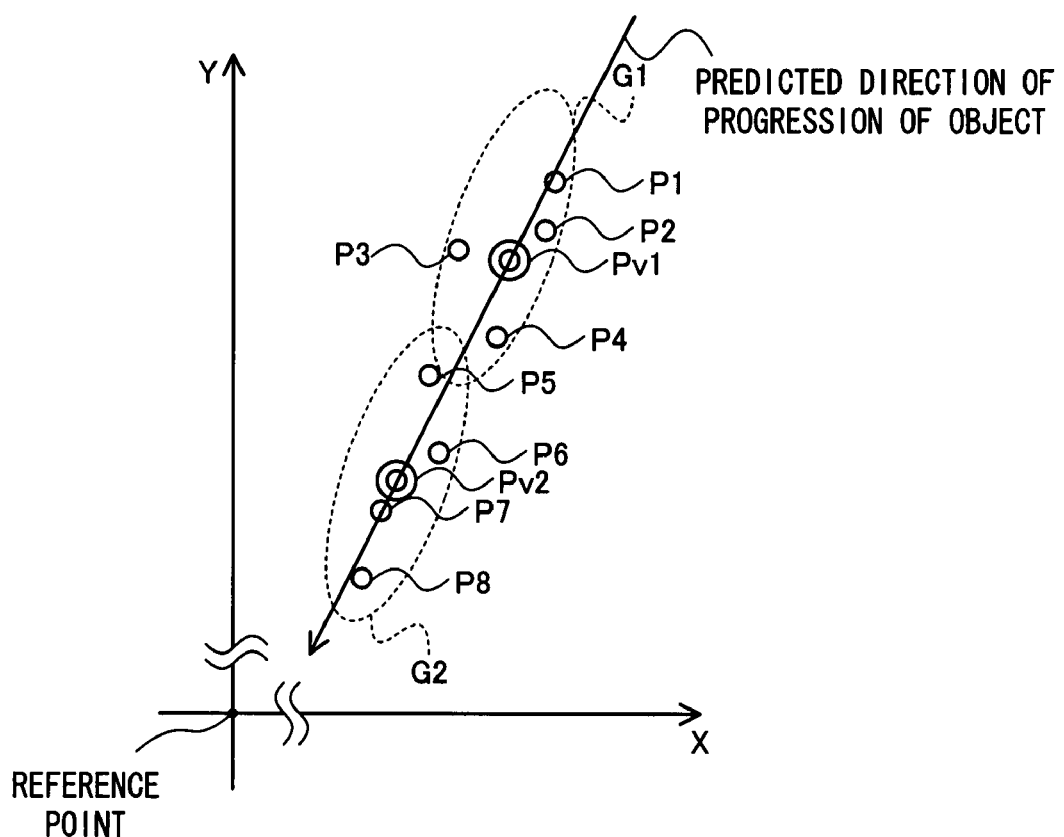

F I G. 8
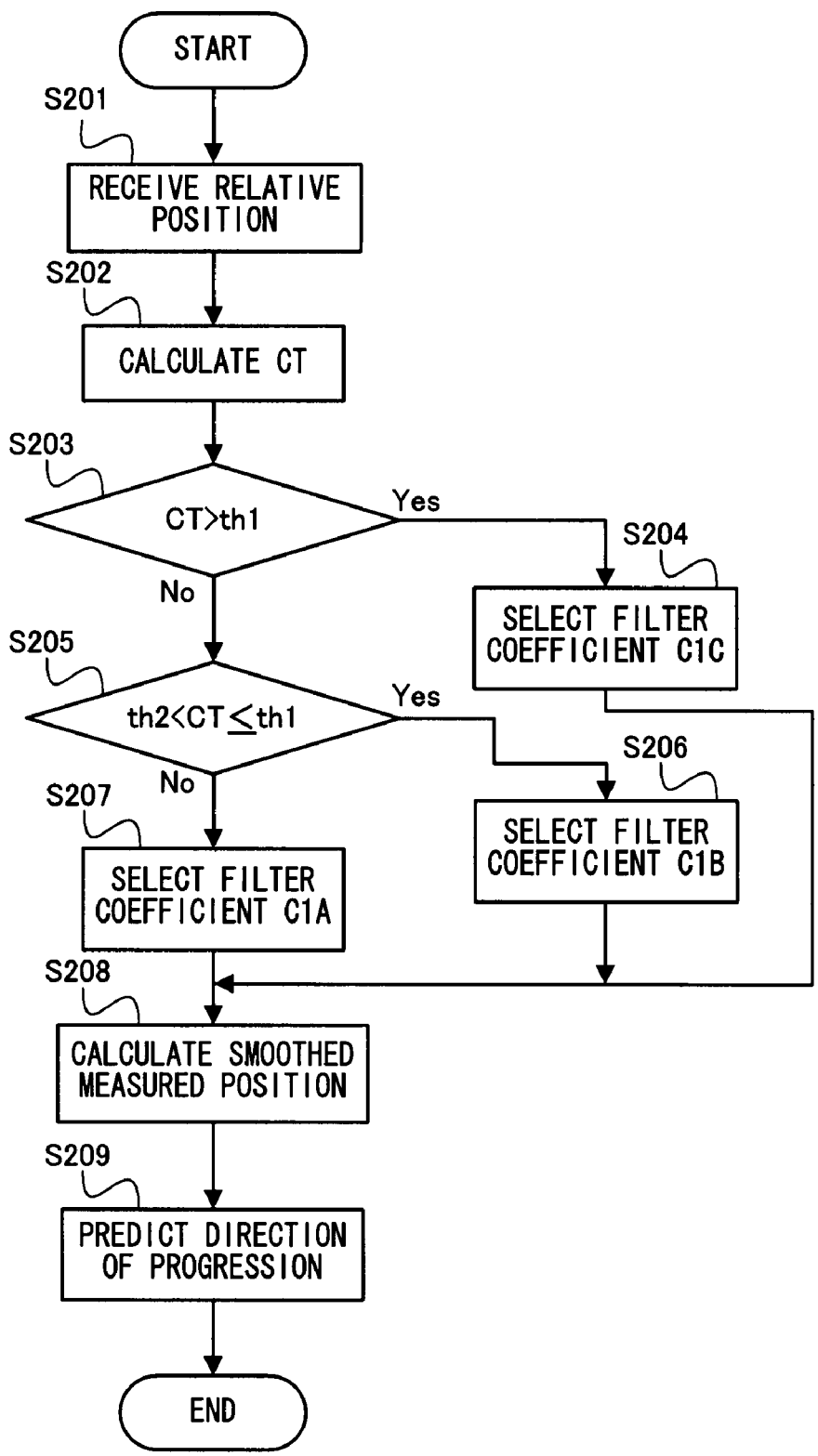

RADAR APPARATUS, AND MEASUREMENT METHOD USED IN THE RADAR APPARATUS

TECHNICAL FIELD

The present invention relates to a radar apparatus, and a measurement method used in the radar apparatus, and more particularly, to a radar apparatus provided to a mobile body such as an automobile, and a measurement method used in the radar apparatus.

BACKGROUND ART

In recent years, a vehicle such as an automobile has a radar apparatus which, based on a radiated electromagnetic wave and a received wave reflected, measures, for example, a relative distance to an object such as another vehicle, a pedestrian, and an object placed on a road, which is present around the own vehicle, a relative velocity of the object, and the direction (azimuth) in which the object is present. The own vehicle having such a radar apparatus further has, for example, an apparatus which, based on the relative distance, the relative velocity, and the azimuth measured by the radar apparatus of the own vehicle, makes control for running while automatically maintaining the distance between the own vehicle and the object, in order to reduce a burden on a driver upon driving, or to enhance safety of a passenger.

The radar apparatus of the own vehicle generates data indicating, as measured information, the relative distance, the relative velocity, and the azimuth of the object, every time a predetermined time interval passes. However, the measured information generated by the radar apparatus has dispersion, error, or the like. Therefore, it is necessary to convert the measured information into smoothed information indicating smoothly the movement of the object by performing filtering processing on the measured information. One example of radar apparatuses performing such processing is a millimeter-wave radar apparatus (hereinafter, referred to as conventional technique) disclosed in Patent Document 1.

The degrees of dispersion of the measured information are different in a radiation area of an electromagnetic wave because the S/N ratios of the measured information are not uniform in the radiation area. In consideration of this, in the conventional technique, a gain of a filter for the filter processing is changed in accordance with the position of an object in the radiation area. For example, in the conventional technique, a gain of the filter is set relatively small in a portion of the radiation area in the middle thereof and near the radar apparatus because the degrees of dispersion of the measured information are relatively small in the portion, the radiation area radially spreading from the radar apparatus. The gain of the filter is set relatively large in a portion of the measurement area in the middle thereof and far from the radar apparatus because the degrees of dispersion of the measured information are relatively large in the portion. The gain of the filter is set largest in the other portion because the degrees of dispersion of the measured information are largest in the other portion. Thus, in the conventional technique, the gain of the filter is changed in consideration of the degrees of dispersion of the measured information which are different depending on the position of the object in the radiation area, whereby the accuracy of the smoothed information is prevented from being changed.

PATENT LITERATURE 1: Japanese Laid-Open Patent Publication No. 2001-242242

DISCLOSURE OF THE INVENTION

Problems to be Solved by the Invention

However, the above-described conventional technique has the following problem. That is, in the conventional technique, the following expression (1) is used as a filtering expression.

$$r[n]=r[n-1]+K\{r_M[n]-r_p[n]\} \quad (1)$$

Here, in the expression (1), r[n] indicates the latest estimated values (smoothed information) of a relative distance, a relative velocity, and an azimuth obtained through filter processing, r[n−1] indicates the previous estimated value, K indicates the gain, rM[n] indicates the latest measured value (value indicated by measured information), and rp[n] indicates the latest predicted value. As is obvious from the expression (1), the filter used in the conventional technique multiplies, by the gain K, the difference obtained by subtracting the latest predicted value from the latest measured value, and then adds the resultant value to the previous estimated value, and therefore, if the gain K is smaller, the latest estimated value is closer to the previous estimated value, and the result of the filtering processing is more stable. Namely, the characteristic of the filter changes in accordance with the gain K.

In the conventional technique, as described above, filter processing using a filter whose gain K is set relatively small is performed on the measured information about an object present in the portion of the radiation area in the middle thereof and near the radar apparatus, whereby the measured information is converted into smoothed information. Then, for example, in the case where filtering processing using a filter whose gain K is set relatively small is performed on the measured information about an object whose relative velocity is relatively large, the object being present in the portion of the radiation area in the middle thereof and near the radar apparatus, the latest estimated value of the object becomes close to the previous estimated value though actually the relative distance has largely changed. As a result, error becomes large between the estimated value and the actual measured information about the object whose relative velocity is relatively large, the object being present in the portion of the radiation area in the middle thereof and near the radar apparatus. That is, since the conventional technique changes the gain K of the filter regardless of the relative velocity of an object and thereby changes a result of the filter processing, it might be impossible to obtain accurate measured information about the object when the relative velocity of the object is large.

Therefore, an object of the present invention is to provide a radar apparatus capable of changing the characteristic of filter processing while considering also the relative velocity of an object.

Solution to the Problems

The present invention has the following features in order to solve the above problem. A first aspect is a radar apparatus provided in an own vehicle, the radar apparatus measuring an object, based on a radiated electromagnetic wave and a received reflected wave, the radar apparatus comprising: a measurement section for generating measured information indicating a position of the object which has been measured and a relative velocity of the object; a contact time calculation section for calculating a contact time that it takes for the own vehicle and the object to come in contact with each other, based on the position and the relative velocity indicated by the measured information; a changing section for, based on the contact time, changing a filter coefficient to be used when filter processing is performed on the position indicated by the measured information; a filter processing section for calculating a corrected position, based on the position indicated by the measured information, by performing the filter processing, wherein the filter processing is performed, by using the filter coefficient changed by the changing section, on the position indicated by the measured information and a previous corrected position which has been previously calculated by the filter processing being performed on the position; and a prediction section for predicting a direction of progression of the object, based on the corrected position. The filter processing section calculates the corrected position, based on the position indicated by the measured information, by multiplying both of the position indicated by the measured information, and the corrected position, by a mixing ratio changed as the filter coefficient by the changing section, and summing the resultant values.

In a second aspect based on the first aspect, plural types of filter coefficients which change the characteristic of the filter processing with respect to the degree of stability and the degree of responsiveness are set in advance, and the changing section, in changing the filter coefficient, selects one filter coefficient among the plural types of filter coefficients in accordance with the length of the contact time, thereby changing a characteristic of the filter processing.

In a third aspect based on the second aspect, the changing section, in changing the filter coefficient, selects a smaller filter coefficient among the plural types of filter coefficients as the contact time becomes shorter, and thereby changes the characteristic so that the degree of responsiveness of the characteristic increases as the contact time becomes shorter.

In a fourth aspect based on the first aspect, the filter processing section includes: an estimation section for estimating a position of the object, based on the corrected position and a previous velocity of the object which has been previously calculated; and a position correcting section for calculating the corrected position, based on the position indicated by the measured information, by performing the filter processing, wherein the filter processing is performed, by using the filter coefficient changed by the changing section, on the position of the object estimated by the estimation section and the position indicated by the measured information.

In a fifth aspect based on the fourth aspect, the filter processing section further includes a velocity correcting section for calculating and estimating a velocity of the object, by performing the filter processing, wherein the filter processing is performed, by using the filter coefficient changed by the changing section, on the previous velocity of the object which has been previously calculated and an estimated velocity of the object estimated based on the corrected position calculated by the position correcting section.

In a seventh aspect based on the first aspect, the filter processing section includes: an estimation section for estimating a position of the object, based on the corrected position and a previous velocity of the object which has been previously calculated; a first position correcting section for calculating the corrected position, based on the position indicated by the measured information, by performing the filter processing, wherein the filter processing is performed, by using a predetermined filter coefficient, on the position of the object estimated by the estimation section and the position indicated by the measured information; and a second position correcting section for calculating the corrected position, based on the position indicated by the measured information, by multiplying both of the position indicated by the measured information and the corrected position calculated by the first correction section, by a mixing ratio changed as the filter coefficient by the changing section, and summing the resultant values, and the prediction section predicts the direction of progression of the object, based on the corrected position calculated by the second position correcting section.

An eighth aspect is a measurement method executed by a radar apparatus provided in an own vehicle, the radar apparatus measuring an object, based on a radiated electromagnetic wave and a received reflected wave, the measurement method comprising: a measurement step of generating measured information indicating a position of the object which has been measured and a relative velocity of the object; a contact time calculation step of calculating a contact time that it takes for the own vehicle and the object to come in contact with each other, based on the position and the relative velocity indicated by the measured information; a changing step of, based on the contact time, changing a filter coefficient to be used when filter processing is performed on the position indicated by the measured information; a filter processing step of calculating a corrected position, based on the position indicated by the measured information, by performing the filter processing, wherein the filter processing is performed, by using the filter coefficient changed in the changing step, on the position indicated by the measured information and a previous corrected position which has been previously calculated by the filter processing being performed on the position; and a prediction step of predicting a direction of progression of the object, based on the corrected position. In the filter processing step, the corrected position is calculated based on the position indicated by the measured information, by multiplying both of the position indicated by the measured information, and the corrected position, by a mixing ratio changed as the filter coefficient in the changing step, and summing the resultant values.

Advantageous Effects of the Invention

According to the first aspect, the contact time is calculated based on the position and the relative velocity of the object, and the filter coefficient is changed in accordance with the calculated contact time. Thus, the characteristic of a filter used for filter processing of correcting the position of the object can be changed in consideration of the relative velocity of the object.

According to the second aspect, one filter coefficient among the plural types of filter coefficients for changing the characteristic of the filter processing with respect to the degree of stability and the degree of responsiveness is selected in accordance with the length of the contact time. Thus, the characteristic of a filter used for filter processing can be changed in accordance with the length of the contact time.

According to the third aspect, a smaller filter coefficient among the plural types of filter coefficients is selected as the filter coefficient as the contact time becomes shorter. Thus, the characteristic of filter processing can be changed so that the degree of responsiveness of the characteristic increases as the contact time becomes shorter.

According to the fourth aspect, the position correcting section performs filter processing using the filter coefficient, on the position of the object indicated by the measured information, and a position of the object estimated based on a previous velocity of the object which has been previously calculated and a previous corrected position previously calculated by the filter processing being performed on the position of the object indicated by the measured information. Thus, the corrected position can be calculated and dispersion among positions of the object indicated by the measured information can be reduced.

According to the fifth aspect, a velocity of the object which is necessary for calculating the corrected positions having reduced dispersion based on positions of the object indicated by the measured information, can be calculated based on an estimated velocity of the object and a previous velocity of the object which has been previously calculated, and the corrected positions which are not influenced by dispersion among relative velocities indicated by the measured information can be calculated.

In addition, according to the first aspect, both of the position indicated by the measured information, and the corrected position, are multiplied by a mixing ratio, and the resultant values are summed. Thus, the position indicated by the measured information can be corrected by using filter processing whose characteristic is changed in accordance with the mixing ratio.

According to the seventh aspect, two types of corrected positions can be calculated. One is calculated by performing the filter processing using a predetermined filter coefficient, on the position of the estimated object and the position of the object indicated by the measured information, and the other one is calculated by mixing the corrected position and the position indicated by the measured information at a mixing ratio changed as the filter coefficient by the changing section. Thus, the position of the object can be corrected by filter processing having different filter characteristics.

In addition, according to the eighth aspect, the same effect as in the first aspect can be obtained.

BRIEF DESCRIPTION OF THE DRAWINGS

FIG. 3 is a diagram showing an example of a method of predicting a direction of progression.

FIG. 8 is a flowchart showing processing performed by an operation section according to a variation of the first embodiment.

DESCRIPTION OF THE REFERENCE CHARACTERS

Figure 1:
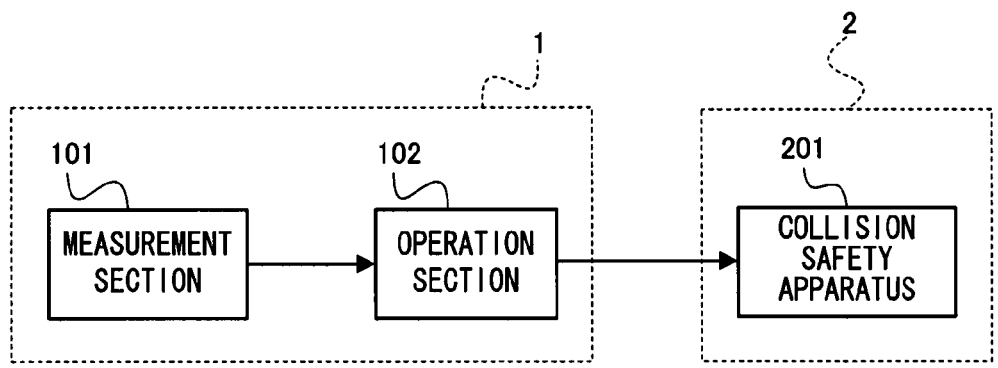
FIG. 1 is a block diagram showing a schematic configuration of a radar apparatus according to a first embodiment.

1, 3 radar apparatus
2, 4 supporting apparatus
101 measurement section
102, 301 operation section
201 collision safety apparatus
401 first supporting apparatus
402 second supporting apparatus

BEST MODE FOR CARRYING OUT THE INVENTION

First Embodiment

FIG. 1 is a block diagram showing a schematic configuration of a radar apparatus 1 according to a first embodiment of the present invention. The radar apparatus 1 includes a measurement section 101, and an operation section 102. Note that a case where an own vehicle has the radar apparatus 1 will be described below as an example.

Typically, the measurement section 101 is a radar, and radiates an electromagnetic wave. Then, after the electromagnetic wave is reflected by an object such as another vehicle, a pedestrian, or an object placed on a road, the measurement section 101 receives a reflected wave from the object. The measurement section 101 measures the relative distance and the relative velocity of the object, based on: a time period from when the electromagnetic wave is radiated to when the reflected wave is received; the phase difference between the radiated electromagnetic wave and the received reflected wave; or the like. In addition, typically, the measurement section 101 includes two or more antennas for receiving the reflected wave. The measurement section 101 also measures, for example, the azimuth of the object, such as the angle of the direction in which the object is present as viewed from a lateral or longitudinal direction, based on the phase difference or the intensity difference between the reflected waves received by the antennas, or the like.

The measurement section 101 measures, as a relative position, the relative distance to the object and the azimuth of the object. Every time the measurement section 101 measures the relative position and the relative velocity, the measurement section 101 sequentially generates relative position information indicating the measured relative position, and relative velocity information indicating the measured relative velocity, respectively. Note that in the following description, an object to be measured by the measurement section 101 is another vehicle, as an example. In addition, the electromagnetic wave radiated by the measurement section 101 may be any type of electromagnetic wave as long as the electromagnetic wave allows an object to be measured as described above. Typically, a millimeter-wave is used for the electromagnetic wave.

Typically, the operation section 102 is an ECU (Electric Control Unit) configured mainly by electronic components such as integrated circuits. When the relative position information and the relative velocity information are generated by the measurement section 101, the operation section 102 receives the generated relative position information and the generated relative velocity information. When the operation section 102 receives the relative position information, the operation section 102 stores, as an actual measured value, the relative position indicated by the received relative position information, in a storage section which is not shown. Moreover, the operation section 102 converts the relative position indicated by the received relative position information into a measured position, and stores the measured position in the storage section which is not shown.

Figure 2:
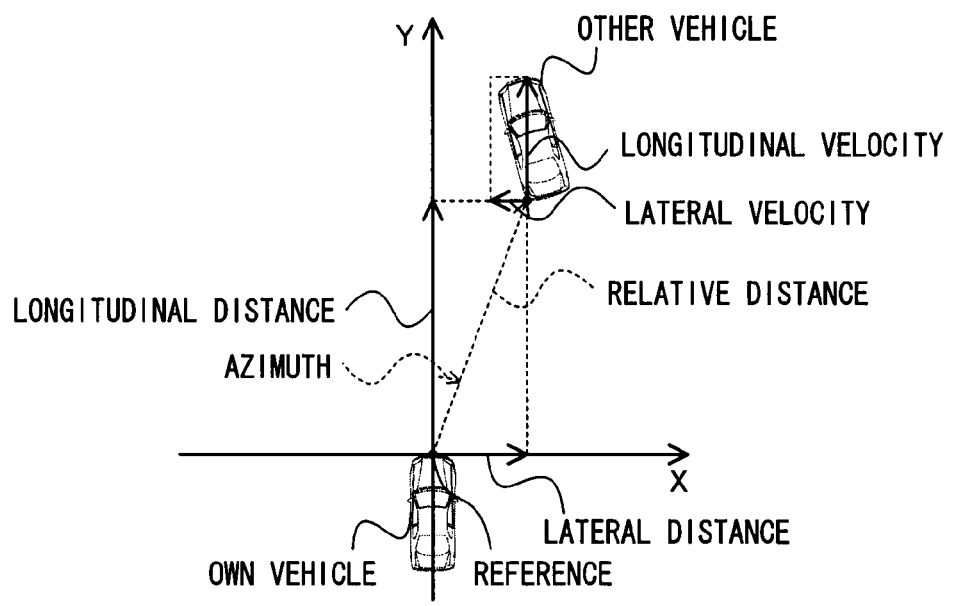
FIG. 2 is a diagram showing an example of a relative position after conversion.

FIG. 2 is a diagram illustrating the measured position converted by the operation section 102 according to the present embodiment. In FIG. 2, there is shown an example of the relative position indicated by the relative position information, that is, an example of an actual measured value of relative distance to the other vehicle and an actual measured value of azimuth of the other vehicle, which are measured by the measurement section 101. As shown in FIG. 2, based on the actual measured value of relative distance and the actual measured value of azimuth which are indicated by the received relative position information, the operation section 102 converts the relative position of the other vehicle, which is represented by the actual measured value of relative distance and the actual measured value of azimuth, into a measured position, which is represented by a lateral distance and a longitudinal distance in a Cartesian coordinate system using the position of the own vehicle as the reference, such as an X-Y coordinate system, for example. After converting the relative position of the other vehicle into the measured position, the operation section 102 stores the converted measured position in the storage section, which is not shown. Note that any known method is used for the above method in which, based on the relative distance and the azimuth which are indicated by the relative position information, the operation section 102 converts the relative distance of the vehicle into the measured position. In addition, the lateral velocity and the longitudinal velocity of the other vehicle shown in FIG. 2 will be described later.

After storing the measured position of the other vehicle, the operation section 102 predicts a direction of progression of the other vehicle measured by the measurement section 101, based on the measured position stored. Here, there is dispersion among actual values of relative position measured by the measurement section 101, and therefore, there is dispersion also among measured positions converted from the relative positions. If the measured positions having dispersion are used to predict a direction of progression of the other vehicle, the accuracy of the predicted direction of progression is decreased. Accordingly, the operation section 102 smoothes the measured positions through filter processing, and then predicts a direction of progression of the other vehicle.

Every time the operation section 102 converts the latest relative position, which is indicated by the relative position information received from the measurement section 101, into the latest measured position, and stores the latest measured position, the operation section 102 performs filtering processing of smoothing the latest measured position. The operation section 102 performs the filter processing on the latest measured position through operations of the following expressions (2) to (5).

$$X(n) = (1 - C1) \cdot Xin + C1 \cdot \{X(n-1) + Vx(n-1) \cdot \Delta T\} \quad (2)$$

$$Y(n) = (1 - C1) \cdot Yin + C1 \cdot \{Y(n-1) + Vy(n-1) \cdot \Delta T\} \quad (3)$$

$$Vx(n) = \frac{(1 - C1) \cdot \{X(n) - X(n-1)\}}{\Delta T} + C1 \cdot Vx(n-1) \quad (4)$$

$$Vy(n) = \frac{(1 - C1) \cdot \{Y(n) - Y(n-1)\}}{\Delta T} + C1 \cdot Vy(n-1) \quad (5)$$

First, the operation of the expression (2) will be described. Upon the filter processing for the lateral distance to the latest measured position stored in the storage section which is not shown, the operation section 102 performs the operation of the expression (2). In the expression (2), X(n) indicates the latest smoothed lateral distance to the other vehicle, which is obtained by performing the filter processing on the latest lateral distance Xin to the other vehicle, C1 indicates a filter coefficient, X(n−1) indicates the smoothed lateral distance to the other vehicle which has been previously obtained by the operation section 102 performing the filter processing, and Vx(n−1) indicates the lateral velocity of the other vehicle which has been previously calculated by the operation section 102. In addition, ΔT in the expression (2) indicates a time interval at which the relative position information is sequentially generated by the measurement section 101. As is obvious from the expression (2), the operation section 102 calculates the latest smoothed lateral distance X(n) by, based on the smoothed lateral distance which has been previously obtained by the filter processing and the lateral velocity which has been previously calculated, performing the filter processing on the latest lateral distance Xin.

More specifically, as indicated by the second term in the right-hand side of the expression (2), the operation section 102 multiplies the previously calculated lateral velocity Vx(n−1) by the time interval ΔT, and thereby estimates a variation amount by which the lateral distance to the other vehicle has varied during a period from the previous generation of the relative position information to next generation, that is, a movement amount in the lateral direction by which the other vehicle has moved during the time interval ΔT. Then, as indicated by the second term in the right-hand side of the expression (2), the operation section 102 adds the estimated movement amount in the lateral direction to the smoothed lateral distance X(n−1) which has been previously obtained by the filter processing, and thereby estimates the latest lateral distance to the other vehicle as an estimated lateral distance. Moreover, as indicated by the expression (2), the operation section 102 multiplies the estimated lateral distance by a filter coefficient (1−C1), multiplies the latest lateral distance Xin stored in the storage section which is not shown, by the filter coefficient C1, and then sums the resultant estimated lateral distance and latest lateral distance. The operation section 102 performs, on the latest lateral distance Xin, the filter processing in which the estimated lateral distance and the latest lateral distance Xin are multiplied by the respective filter coefficients and then summed, thereby calculating the latest smoothed lateral distance X(n). After calculating the latest smoothed lateral distance X(n), the operation section 102 stores the calculated latest smoothed lateral distance X(n) in the storage section which is not shown. The above is the description of the operation of the expression (2).

Next, the operation of the expression (3) will be described. Upon the filter processing for the longitudinal distance to the latest measured position stored in the storage section which is not shown, the operation section 102 performs the operation of the expression (3). In the expression (3), Y(n) indicates the latest smoothed longitudinal distance to the other vehicle, which is obtained by performing the filter processing on the latest longitudinal distance Yin, C1 indicates the above-described filter coefficient, Y(n−1) indicates the smoothed longitudinal distance to the other vehicle which has been previously obtained by the operation section 102 performing the filter processing, and Vy(n−1) indicates the longitudinal velocity of the other vehicle which has been previously calculated by the operation section 102. In addition, ΔT in the expression (3) indicates the above described time interval. As is obvious from the expression (3), the operation section 102 calculates the latest smoothed longitudinal distance Y(n) by, based on the smoothed longitudinal distance which has been previously obtained by the filter processing and the longitudinal velocity which has been previously calculated, performing the filter processing on the latest longitudinal distance Yin.

More specifically, upon the calculation of the smoothed longitudinal distance Y(n), similarly to the calculation of the smoothed lateral distance X(n), the operation section 102 multiplies the previously calculated longitudinal velocity Vy(n−1) by the time interval ΔT, and thereby estimates a variation amount by which the longitudinal distance to the other vehicle has varied during a period from the previous generation of the relative position information to next generation, that is, a movement amount in the longitudinal direction by which the other vehicle has moved during the time interval ΔT. Then, as indicated by the second term in the right-hand side of the expression (3), the operation section 102 adds the estimated movement amount in the longitudinal direction to the smoothed longitudinal distance Y(n−1) which has been previously obtained by the filter processing, and thereby estimates the latest longitudinal distance to the other vehicle as an estimated longitudinal distance. Moreover, as indicated by the expression (3), the operation section 102 multiplies the estimated longitudinal distance by the filter coefficient (1−C1), multiplies the latest longitudinal distance Yin stored in the storage section which is not shown, by the filter coefficient C1, and then sums the resultant estimated longitudinal distance and latest longitudinal distance. The operation section 102 performs, on the latest longitudinal distance Yin, the filter processing in which the estimated longitudinal distance and the latest longitudinal distance Yin are multiplied by the respective filter coefficients and then summed, thereby calculating the latest smoothed longitudinal distance Y(n). After calculating the latest smoothed longitudinal distance Y(n), the operation section 102 stores the calculated latest smoothed longitudinal distance Y(n) in the storage section which is not shown. The above is the description of the operation of the expression (3). Note that hereinafter, the position indicated by the smoothed lateral distance and the smoothed longitudinal distance is referred to as a smoothed measured position.

Next, the operation of the expression (4) will be described. Upon calculation of the lateral velocity of the other vehicle, the operation section 102 performs the operation of the expression (4). In the expression (4), Vx(n) indicates the latest lateral velocity of the other vehicle calculated by the operation section 102. As is obvious from the expression (4), the operation section 102 calculates the latest lateral velocity Vx(n) of the other vehicle, based on the smoothed lateral distance and the previously calculated lateral velocity of the other vehicle. More specifically, upon the calculation of the latest lateral velocity Vx(n) of the other vehicle, as indicated by the first term in the right-hand side of the expression (4), the operation section 102 subtracts, from the latest smoothed lateral distance X(n), the smoothed lateral distance X(n−1) which has been previously obtained by the filter processing, and divides the resultant value by the time interval ΔT. By calculating the difference between the smoothed lateral distance X(n) and the smoothed lateral distance X(n−1), the operation section 102 estimates a movement amount in the lateral direction by which the other vehicle has moved, based on the smoothed lateral distance. Then, the operation section 102 divides, by the time interval ΔT, the estimated movement amount in the lateral direction by which the other vehicle has moved, thereby estimating the latest lateral velocity of the other vehicle as an estimated lateral velocity.

After obtaining the estimated lateral velocity of the other vehicle, the operation section 102 multiplies the estimated lateral velocity by the filter coefficient (1−C1), multiplies the previously calculated lateral velocity Vx(n−1) of the other vehicle by the filter coefficient C1, and then sums the resultant estimated lateral velocity and previously calculated lateral velocity, as indicated by the expression (4). The operation section 102 performs, on the estimated lateral velocity, the filter processing in which the estimated lateral velocity and the previously calculated lateral velocity Vx(n−1) are multiplied by the respective filter coefficients and then summed, thereby calculating the latest lateral velocity Vx(n) of the other vehicle. After calculating the latest lateral velocity Vx(n) of the other vehicle, the operation section 102 stores the calculated latest lateral velocity Vx(n) in the storage section which is not shown. The above is the description of the operation of the expression (4).

Next, the operation of the expression (5) will be described. Upon calculation of the longitudinal velocity of the other vehicle, the operation section 102 performs the operation of the expression (5). In the expression (5), Vy(n) indicates the latest longitudinal velocity of the other vehicle calculated by the operation section 102. As is obvious from the expression (5), the operation section 102 calculates the latest longitudinal velocity Vy(n) of the other vehicle, based on the smoothed longitudinal distance and the previously calculated longitudinal velocity of the other vehicle. More specifically, upon the calculation of the latest longitudinal velocity Vy(n) of the other vehicle, as indicated by the first term in the right-hand side of the expression (5), the operation section 102 subtracts, from the latest smoothed longitudinal distance Y(n), the smoothed longitudinal distance Y(n−1) which has been previously obtained by the filter processing, and divides the resultant value by the time interval ΔT. By calculating the difference between the smoothed longitudinal distance Y(n) and the smoothed longitudinal distance Y(n−1), the operation section 102 estimates a movement amount in the longitudinal direction by which the other vehicle has moved, based on the smoothed longitudinal distance. Then, the operation section 102 divides, by the time interval ΔT, the estimated movement amount in the longitudinal direction by which the other vehicle has moved, thereby estimating the latest longitudinal velocity of the other vehicle as an estimated longitudinal velocity.

After obtaining the estimated longitudinal velocity of the other vehicle, the operation section 102 multiplies the estimated longitudinal velocity by the filter coefficient (1−C1), multiplies the previously calculated longitudinal velocity Vy(n−1) of the other vehicle by the filter coefficient C1, and then sums the resultant estimated longitudinal velocity and previously calculated longitudinal velocity, as indicated by the expression (5). The operation section 102 performs, on the estimated longitudinal velocity, the filter processing in which the estimated longitudinal velocity and the previously calculated longitudinal velocity Vy(n−1) are multiplied by the respective filter coefficients and then summed, thereby calculating the latest longitudinal velocity Vy(n) of the other vehicle. After calculating the latest longitudinal velocity Vy(n) of the other vehicle, the operation section 102 stores the calculated latest longitudinal velocity Vy(n) in the storage section which is not shown. The above is the description of the operation of the expression (5).

Note that upon the calculation of the lateral velocity and the longitudinal velocity, a method in which the operation section 102 performs operations for the lateral velocity and the longitudinal velocity, based on an actual measured value of relative velocity indicated by the relative velocity information generated by the measurement section 101, can also be used instead of the method using the smoothed lateral distance or the smoothed longitudinal distance as described in the operations of the expressions (4) and (5). However, upon the calculation of the smoothed lateral distance and the smoothed longitudinal distance based on the operations of the expressions (2) and (3), an absolute velocity such as $Vx(n-1)$ or $Vy(n-1)$ is needed. Therefore, the operation section 102 according to the present embodiment uses the smoothed lateral distance and the smoothed longitudinal distance, which indicate the position of the other vehicle based on a reference of the own vehicle, for calculating the lateral velocity and the longitudinal velocity, respectively. In addition, upon the calculation of the lateral velocity and the longitudinal velocity, by using the smoothed lateral distance and the smoothed longitudinal distance instead of the lateral distance and the longitudinal distance to the measured position which is converted from each of the relative positions having dispersion, the operation section 102 according to the present embodiment can calculate the lateral velocity and the longitudinal velocity which are not influenced by the dispersion.

Here, by the operation section 102 changing the filter coefficient $C1$ upon the calculation of the smoothed lateral distance $X(n)$, the resultant value after the filter processing changes as described below. Specifically, upon the operation of the expression (2), if the operation section 102 decreases the filter coefficient $C1$, by which the estimated lateral distance is to be multiplied, so that the filter coefficient $(1-C1)$, by which the latest lateral distance $Xin$ is to be multiplied, relatively increases, the latest smoothed lateral distance $X(n)$ is calculated such that the latest lateral distance $Xin$ is relatively largely reflected in the latest smoothed lateral distance $X(n)$. That is, if the operation section 102 decreases the filter coefficient $C1$ so that the filter coefficient $(1-C1)$, by which the latest lateral distance $Xin$ is to be multiplied, relatively increases, and then performs the operation of the expression (2), the smoothed lateral distance $X(n)$ having high responsiveness, which is close to the current actual lateral distance to the other vehicle, can be calculated.

On the other hand, upon the operation of the expression (2), if the operation section 102 increases the filter coefficient $C1$, by which the estimated lateral distance is to be multiplied, so that the filter coefficient $(1-C1)$, by which the latest lateral distance $Xin$ is to be multiplied, relatively decreases, the latest smoothed lateral distance $X(n)$ is calculated such that the estimated lateral distance is relatively largely reflected in the latest smoothed lateral distance $X(n)$. As described above, the estimated lateral distance is a lateral distance estimated by summing: the movement amount in the lateral direction by which the other vehicle has moved, the movement amount being estimated based on the previously calculated lateral velocity $Vx(n-1)$; and the smoothed lateral distance $X(n-1)$ which has been previously obtained by the filter processing. Namely, the estimated lateral distance is a value calculated based on a value which has been calculated in the past. That is, if the operation section 102 increases the filter coefficient $C1$, by which the estimated lateral distance is to be multiplied, so that the filter coefficient $(1-C1)$, by which the latest lateral distance $Xin$ is to be multiplied, relatively decreases, and then performs the operation of the expression (2), the latest smoothed lateral distance $X(n)$ is calculated such that a value calculated based on a value which has been calculated in the past is relatively largely reflected in the latest smoothed lateral distance $X(n)$. That is, if the operation section 102 relatively increases the filter coefficient $C1$, by which the estimated lateral distance is to be multiplied, and then performs the operation of the expression (2), the smoothed lateral distance $X(n)$ having high stability, in which a value that has been calculated in the past is relatively largely reflected in comparison with the current actual lateral distance to the other vehicle, can be calculated.

Similarly, regarding the calculation of the smoothed longitudinal distance $Y(n)$, upon the operation of the expression (3), if the operation section 102 decreases the filter coefficient $C1$, by which the estimated longitudinal distance is to be multiplied, so that the filter coefficient $(1-C1)$, by which the latest longitudinal distance $Yin$ is to be multiplied, relatively increases, the smoothed longitudinal distance $Y(n)$ having high responsiveness, which is relatively close to the current actual lateral distance to the other vehicle, can be calculated. On the other hand, upon the operation of the expression (3), if the operation section 102 increases the filter coefficient $C1$, by which the estimated longitudinal distance is to be multiplied, the smoothed longitudinal distance $Y(n)$ having high stability, in which a value that has been calculated in the past is relatively largely reflected in comparison with the current actual longitudinal distance to the other vehicle, can be calculated.

Note that hereinafter, the filter coefficients ($C1$ and $(1-C1)$) which allow the smoothed lateral distance $X(n)$ having high responsiveness and the smoothed longitudinal distance $Y(n)$ having high responsiveness to be calculated as described above, are referred to as filter coefficients having high responsiveness. More specifically, if the filter coefficient $(1-C1)$ is equal to or larger than the filter coefficient $C1$, the filter coefficient $(1-C1)$ and the filter coefficient $C1$ are referred to as filter coefficients having high responsiveness. In addition, the filter coefficients ($C1$ and $(1-C1)$) which allow the smoothed lateral distance $X(n)$ having high stability and the smoothed longitudinal distance $Y(n)$ having high stability to be calculated as described above, are referred to as filter coefficients having high stability. More specifically, if the filter coefficient $C1$ is larger than the filter coefficient $(1-C1)$, the filter coefficient $(1-C1)$ and the filter coefficient $C1$ are referred to as filter coefficients having high stability.

The operation section 102 according to the present embodiment selectively uses the filter coefficients having high responsiveness or the filter coefficients having high stability, based on the relative distance to the other vehicle and the relative velocity of the other vehicle, as described later, thereby changing the characteristic of the filter processing. In order to describe a way of selectively using the filter coefficients having high responsiveness or the filter coefficients having high stability, an example of a method of the operation section 102 predicting a direction of progression of the other vehicle as described above, and a supporting apparatus 2 shown in FIG. 1 will be described.

First, an example of the method of the operation section 102 predicting a direction of progression of the other vehicle will be described. FIG. 3 is a diagram for illustrating the method of the operation section 102 predicting a direction of progression of the other vehicle. More specifically, as shown in FIG. 3, the operation section 102 registers, in the aforementioned Cartesian coordinate system, smoothed measured positions P1 to P8 of the other vehicle, which are indicated by the smoothed lateral distance and the smoothed longitudinal distance stored in the storage section which is not shown. The smoothed measured positions P1 to P8 shown in FIG. 3 are calculated and stored in the storage section in the order from the smoothed measured position P1 to the smoothed measured position P8. As shown in FIG. 3, every time the operation section 102 registers a predetermined number of smoothed measured positions, the operation section 102 groups together the registered smoothed measured positions. In FIG. 3, as an example, every time the operation section 102 registers four smoothed measured positions, the operation section 102 groups together the registered smoothed measured positions, the resultant groups being shown as a group G1 and a group G2.

After grouping together the registered smoothed measured positions, the operation section 102 calculates an average position of the smoothed measured positions included in each group. Here, the average position is a position indicated by: an average lateral distance obtained by dividing the sum of the smoothed lateral distances of the smoothed measured positions included in one group by the number of the smoothed measured positions included in the one group; and an average longitudinal distance obtained by dividing the smoothed longitudinal distances of the smoothed measured positions included in the one group by the number of the smoothed measured positions included in the one group. In FIG. 3, the average positions of the group G1 and the group G2 calculated by the operation section 102 are represented by an average position Pv1 and an average position Pv2, respectively, as an example. Note that among the smoothed measured positions included in a group, the operation section 102 may exclude a largely dispersed smoothed measured position which is, for example, a predetermined distance away from a trajectory obtained by approximating a trajectory of the smoothed measured positions by a least square method or the like, and then may calculate the average position of the group.

After calculating at least two average positions, the operation section 102 predicts a direction of progression of the other vehicle as being the direction of a trajectory connecting the calculated average positions in the order of the calculation. In FIG. 3, the direction of a trajectory connecting the average position of the group G1 and the average position of the group G2 in the order of the group G1 and then the group G2 are shown as an example of the direction of progression of the other vehicle predicted by the operation section 102. After predicting the direction of progression of the other vehicle, the operation section 102 generates progression direction information indicating the predicted direction of progression.

The above is the description of an example of the method of the operation section 102 predicting the direction of progression of the other vehicle. Note that although an example of predicting only a direction of progression of the other vehicle is described above, the operation section 102 may further predict a progression velocity of the other vehicle, based on the relative velocity of the other vehicle indicated by the relative velocity information received from the measurement section 101, a progression velocity of the other vehicle indicated by the above-described lateral velocity and longitudinal velocity, or the like, and may predict a progression direction vector indicating the predicted progression direction and progression velocity. In addition, the above method of the operation section 102 predicting a direction of progression of the other vehicle is just an example. Any known method may be used as long as the method allows the operation section 102 to predict a direction of progression of the other vehicle, based on the relative position or the smoothed measured position.

Next, the supporting apparatus 2 shown in FIG. 1 will be described. At a stage subsequent to the radar apparatus 1, the supporting apparatus 2 is provided as shown in FIG. 1. The supporting apparatus 2 includes a collision safety apparatus 201.

By using a known method based on: the direction of progression of the other vehicle predicted by the operation section 102; the direction of progression of the own vehicle estimated by another apparatus which is not shown using a known method; a predicted time until collision calculated by the operation section 102 as described later; and the like, the collision safety apparatus 201, for example, automatically applies a brake or automatically winds up a seatbelt to pick up the slack when the collision safety apparatus 201 has determined that: the direction of progression of the other vehicle can lead to the collision of the own vehicle and the other vehicle; a predicted time until the collision is relatively short; and there is a possibility that the own vehicle and the other vehicle will collide with each other. Thus, the collision safety apparatus 201 enhances safety for collision of the own vehicle and the other vehicle. The above is the description of the supporting apparatus 2 according to the present embodiment.

Figure 4:
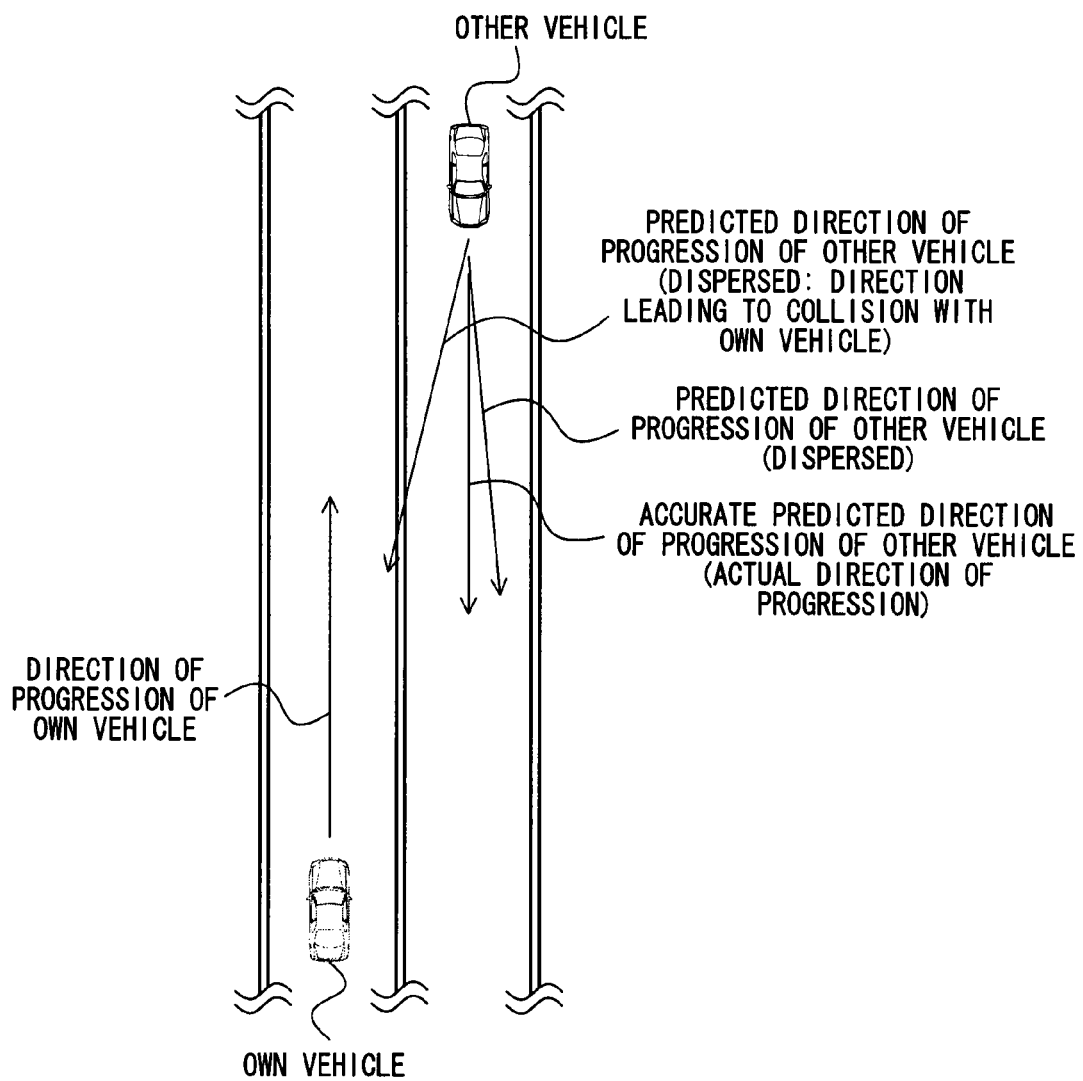
FIG. 4 is a diagram showing an example of a prediction result of a direction of progression.

Next, a way of selectively using the filter coefficients having high responsiveness or the filter coefficients having high stability will be described. FIG. 4 is a diagram showing an example of the direction of progression of the other vehicle predicted by the operation section 102. A driver of the other vehicle constantly makes slight corrections to the direction of progression of the other vehicle so that the other vehicle can constantly progress along a progression path. Therefore, an actual direction of progression of the other vehicle constantly varies slightly. In addition, as described above, there is dispersion among actual measured values of relative position obtained by the measurement section 101. In addition, if the operation section 102 uses the filter coefficients having high responsiveness to calculate a smoothed lateral distance and a smoothed longitudinal distance, each of the lateral distance Xin and the longitudinal distance Yin to the latest measured position converted from each of the actual measured values of relative position having dispersion is multiplied by the relatively large filter coefficient (1−C1), as described above. Therefore, even though the operation section 102 calculates smoothed lateral distances and smoothed longitudinal distances and thereby reduces the dispersion among the actual measured values of relative position obtained by the measurement section 101, slight dispersion can remain among the smoothed lateral distances and the smoothed longitudinal distances when the operation section 102 uses the filter coefficients having high responsiveness for the calculation.

If the operation section 102, based on the smoothed lateral distances and the smoothed longitudinal distances having slight dispersion, predicts directions of progression of the other vehicle as described above, there is slight dispersion among the predicted directions of progression of the other vehicle, the predicted directions including an accurate direction of progression. Then, for example, as shown in FIG. 4, when the own vehicle and the other vehicle are relatively distant from each other, the predicted directions of progression having slight dispersion also include a direction of progression which is different from an accurate direction of progression and which can cause the other vehicle to collide with the own vehicle. When a direction of progression different from an actual direction of progression is predicted, the collision safety apparatus 201 can erroneously determine that there is a high possibility that the own vehicle and the other vehicle will collide with each other.

Therefore, when the own vehicle and the other vehicle are relatively distant from each other, it is preferable that the operation section 102 uses the filter coefficients having high stability to calculate the smoothed lateral distance X(n) and the smoothed longitudinal distance Y(n) in order to further reduce dispersion. If the operation section 102 uses the filter coefficients having high stability to calculate the smoothed lateral distance X(n) and the smoothed longitudinal distance Y(n), as described above, the estimated lateral distance and the estimated longitudinal distance calculated based on values which have been calculated in the past are relatively largely reflected in the smoothed lateral distance X(n) and the smoothed longitudinal distance Y(n), respectively, and the lateral distance Xin and the longitudinal distance Yin to the latest measured position converted from each of the actual measured values of relative position having dispersion are reflected at a relatively low level in the smoothed lateral distance X(n) and the smoothed longitudinal distance Y(n), respectively. Therefore, dispersion among the predicted directions of progression can be further reduced, and a direction of progression which is different from an actual direction of progression and which can cause the other vehicle to collide with the own vehicle, can be prevented from being predicted when the own vehicle and the other vehicle are relatively distant from each other. Moreover, the collision safety apparatus 201 can be prevented from erroneously determining that there is a high possibility that the own vehicle and the other vehicle will collide with each other.

Figure 5:
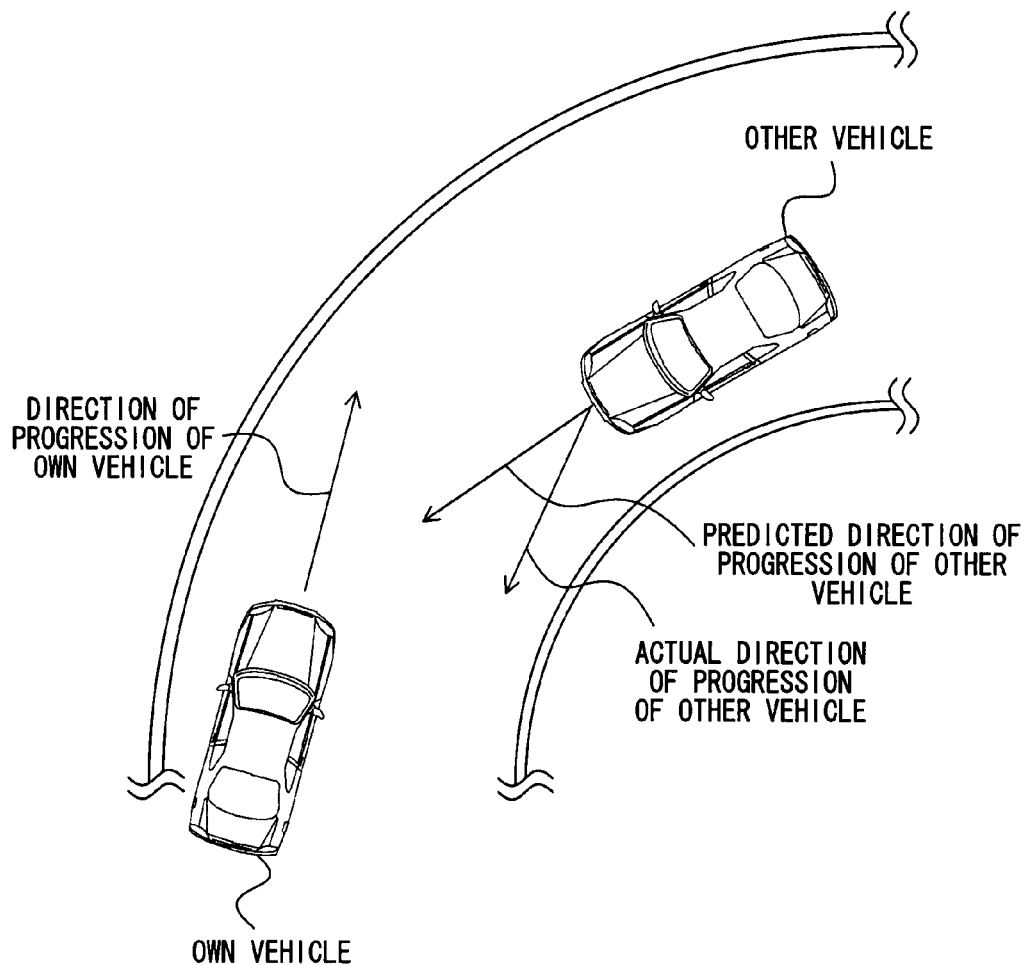
FIG. 5 is a diagram showing another example of a prediction result of a direction of progression.

FIG. 5 is a diagram showing another example of the direction of progression of the other vehicle predicted by the operation section 102. If the operation section 102 uses the filter coefficients having high stability to calculate the smoothed lateral distance and the smoothed longitudinal distance, as described above, a direction of progression which is different from an actual direction of progression and which can cause the other vehicle to collide with the own vehicle, can be prevented from being predicted when the own vehicle and the other vehicle are relatively distant from each other. However, the direction of progression predicted when the operation section 102 uses the filter coefficients having high stability is close to a relatively old actual direction of progression of the other vehicle, because if the operation section 102 uses the filter coefficients having high stability, as described above, the estimated lateral distance and the estimated longitudinal distance calculated based on values which have been calculated in the past are relatively largely reflected in the smoothed lateral distance and the smoothed longitudinal distance, respectively. Then, for example, as shown in FIG. 5, when the own vehicle and the other vehicle relatively close to each other are going to pass each other at a curve, if the operation section 102 performs filter processing using the filter coefficients having high stability to calculate the smoothed lateral distance and the smoothed longitudinal distance, a direction of progression which is different from an actual direction of progression and which can cause the other vehicle to collide with the own vehicle is predicted even though an actual direction of progression of the other vehicle is not a direction which can cause the other vehicle to collide with the own vehicle. Then, when the direction of progression which is different from an actual direction of progression is predicted, the collision safety apparatus 201 can erroneously determine that there is a high possibility that the own vehicle and the other vehicle will collide with each other.

Therefore, the operation section 102 uses the filter coefficients having high responsiveness to calculate the smoothed lateral distance X(n) and the smoothed longitudinal distance Y(n) so as not to predict a direction of progression which is different from an actual direction of progression and which can cause the other vehicle to collide with the own vehicle when the own vehicle and the other vehicle are relatively close to each other. If the operation section 102 uses the filter coefficients having high responsiveness to calculate the smoothed lateral distance X(n) and the smoothed longitudinal distance Y(n), as described above, the latest lateral distance Xin and the latest longitudinal distance Yin are relatively largely reflected in the smoothed lateral distance X(n) and the smoothed longitudinal distance Y(n). Therefore, a direction of progression close to the current direction of progression of the other vehicle is predicted, and a direction of progression which is different from an actual direction of progression and which can cause the other vehicle to collide with the own vehicle can be prevented from being predicted when the own vehicle and the other vehicle are relatively close to each other. Moreover, the collision safety apparatus 201 can be prevented from erroneously determining that there is a high possibility that the own vehicle and the other vehicle will collide with each other.

As described above, the operation section 102 according to the present embodiment needs to selectively use the filter coefficients, based on at least the relative distance to the other vehicle, in order to prevent the collision safety apparatus 201 from erroneously determining that there is a high possibility that the own vehicle and the other vehicle will collide with each other. More specifically, the operation section 102 calculates the filter coefficients, based on a predicted time until collision predicted by dividing the relative distance to the other vehicle by the relative velocity of the other vehicle, thereby the filter coefficients are selectively used. Upon the calculation of a predicted time until collision, the operation section 102 calculates the predicted time until collision by dividing the relative distance which is indicated by the latest relative position information received from the measurement section 101, by the relative velocity which is indicated by the latest relative velocity information. By calculating the filter coefficient, based on a predicted time until collision, and by performing filter processing using the calculated filter coefficient, the operation section 102 can predict a direction of progression which can reduce a possibility that the collision safety apparatus 201, which determines a possibility of collision, based on the predicted time until collision or the like, will perform erroneous determination.

Moreover, the operation section 102 determines the filter coefficient C1 such that: when a predicted time until collision is relatively short, the operation section 102 uses the filter coefficients having relatively high responsiveness to calculate the smoothed lateral distance X(n) and the smoothed longitudinal distance Y(n); and when a predicted time until collision is relatively long, the operation section 102 uses the filter coefficients having relatively high stability to calculate the smoothed lateral distance X(n) and the smoothed longitudinal distance Y(n). Specifically, the operation section 102 determines the filter coefficient C1 by using the following expression (6).

$$C1 = \frac{k1}{T1}(CT - Vstart1) \quad (6)$$

Figure 6:
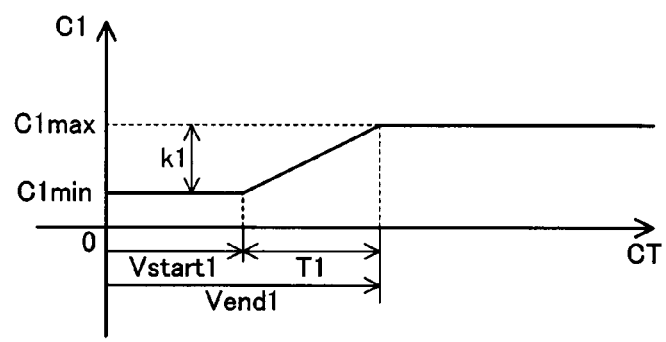
FIG. 6 is a diagram showing an example of a relationship between a filter coefficient and a predicted time until collision.

In the expression (6), C1 is the filter coefficient C1 in the expressions (2) to (4), and CT indicates a predicted time until collision described above. By the operation section 102 performing an operation of the expression (6), the filter coefficient C1 is determined so as to increase by k1 per a predetermined time period T1 when it is assumed that the predicted time CT until collision continues to increase. Here, the filter coefficient C1 has predetermined lower and upper limits. FIG. 6 is a diagram showing an example of a relationship between the predicted time CT until collision and the filter coefficient C1 determined by the operation section 102 performing the operation of the expression (6). C1min shown in FIG. 6 is the predetermined lower limit of the filter coefficient C1, and C1max is the predetermined upper limit of the filter coefficient C1. In addition, when it is assumed the predicted time CT until collision continues to increase from zero, Vstart1 shown in FIG. 6 is a predetermined predicted time until collision at a point where the filter coefficient C1 starts to increase from the lower limit C1min, and Vend1 is a predetermined predicted time until collision at a point where the filter coefficient C1 reaches the upper limit C1max after the predicted time CT until collision further continues to increase. Note that the lower limit value C1min and the upper limit value C1max may be any values. Typically, the lower limit value C1min is set at zero, and the upper limit value C1max is set at 1.

By performing the operation of the expression (6) to calculate the filter coefficient C1, when the predicted time CT until collision is relatively large and the own vehicle and the other vehicle are relatively distant from each other, the relatively large filter coefficient C1 is calculated and the filter coefficient (1−C1) is relatively small. Therefore, the filter coefficients having relatively high stability can be calculated. On the other hand, when the predicted time CT until collision is relatively small and the own vehicle and the other vehicle are relatively close to each other, the relatively small filter coefficient C1 is calculated and the filter coefficient (1−C1) is relatively large. Therefore, the filter coefficients having relatively high responsiveness can be calculated. That is, the operation section 102 according to the present embodiment can optimize the characteristic of the filter processing between stability and responsiveness, in accordance with the predicted time CT until collision.

The above is the description of the radar apparatus 1 according to the present embodiment. Next, processing performed by the operation section 102 according to the present embodiment will be described with reference to a flowchart shown in FIG. 7. Note that the operation section 102 starts the processing shown by the flowchart in FIG. 7 at a predetermined starting timing, e.g., when an ignition switch of the own vehicle is turned on or when the own vehicle starts to run, and repeats the processing until a predetermined ending timing.

In step S101, the operation section 102 obtains the relative position information and the relative velocity information generated by the measurement section 101, and stores the relative position indicated by the obtained relative position information, and the relative velocity indicated by the obtained relative velocity information. Moreover, the operation section 102 converts the relative position indicated by the obtained relative position information into a measured position as described above, and stores the converted measured position in the storage section which is not shown. After completing processing in step S101, the operation section 102 proceeds to processing in step S102.

In step S102, the operation section 102 divides a relative distance to the relative position indicated by the relative position information obtained in step S101, by a relative velocity indicated by the relative velocity information obtained in step S101, thereby calculating the aforementioned predicted time CT until collision. After completing processing in step S102, the operation section 102 proceeds to processing in step S103.

In step S103, the operation section 102 substitutes the predicted time CT until collision calculated in step S102 into the expression (6), thereby calculating the filter coefficient C1. Note that when the calculated filter coefficient C1 is larger than the aforementioned upper limit, the operation section 102 changes the calculated filter coefficient C1 to the upper limit. On the other hand, when the calculated filter coefficient C1 is smaller than the aforementioned lower limit, the operation section 102 changes the calculated filter coefficient C1 to the lower limit. After completing processing in step S103, the operation section 102 proceeds to processing in step S104.

In step S104, the operation section 102 performs filter processing in which the operation section 102 performs the operations of the expressions (2) to (5) by using the filter coefficient C1 calculated in step S103, thereby calculating the smoothed measured position, the lateral velocity Vx(n), and the longitudinal velocity Vy(n). Note that when the operation section 102 performs the processing shown by the flowchart in FIG. 7 for the first time, that is, when previous values needed for the operations of the expressions (2) to (5), such as the smoothed lateral distance X(n−1) which has been previously obtained by the filter processing, the smoothed longitudinal distance Y(n−1) which has been previously obtained by the filter processing, the previously calculated lateral velocity Vx(n−1), and the previously calculated longitudinal velocity Vy(n−1), are not stored in the storage section which is not shown, the operation section 102 may substitutes predetermined values instead of the previous values, and then may perform the operations of the expressions (2) to (5). After completing processing in step S104, the operation section 102 proceeds to processing in step S105.

In step S105, the operation section 102 predicts a direction of progression of the other vehicle, based on the smoothed lateral distance and the smoothed longitudinal distance calculated in step S104, as described above. In step S105, after predicting the direction of progression of the other vehicle, the operation section 102 generates progression direction information indicating the predicted direction of progression. Note that when a number of the smoothed measured positions necessary for predicting the direction of progression in step S105 are not stored in the storage section which is not shown, e.g., when the operation section 102 performs the processing shown by the flowchart in FIG. 7 for the first time, the operation section 102 may use predetermined measured positions instead of missing smoothed measured positions to predict a direction of progression of the other vehicle. After completing processing in step S105, the operation section 102 returns to processing in step S101.

The above is the description of processing performed by the operation section 102 according to the present embodiment. The radar apparatus 1 according to the first embodiment calculates the filter coefficients, based on the predicted time CT until collision, and thus can optimize the characteristic of the filter processing between stability and responsiveness, in accordance with the predicted time CT until collision. Moreover, the radar apparatus 1 according to the first embodiment can predict a direction of progression of the other vehicle, based on the smoothed measured positions obtained by performing the filter processing having an optimized characteristic on the relative positions having dispersion, measured by the measurement section 101, and can prevent erroneous determination from being performed by an apparatus, such as the above collision safety apparatus 201, provided at a stage subsequent to the radar apparatus 1.

Variation of First Embodiment

Figure 7:
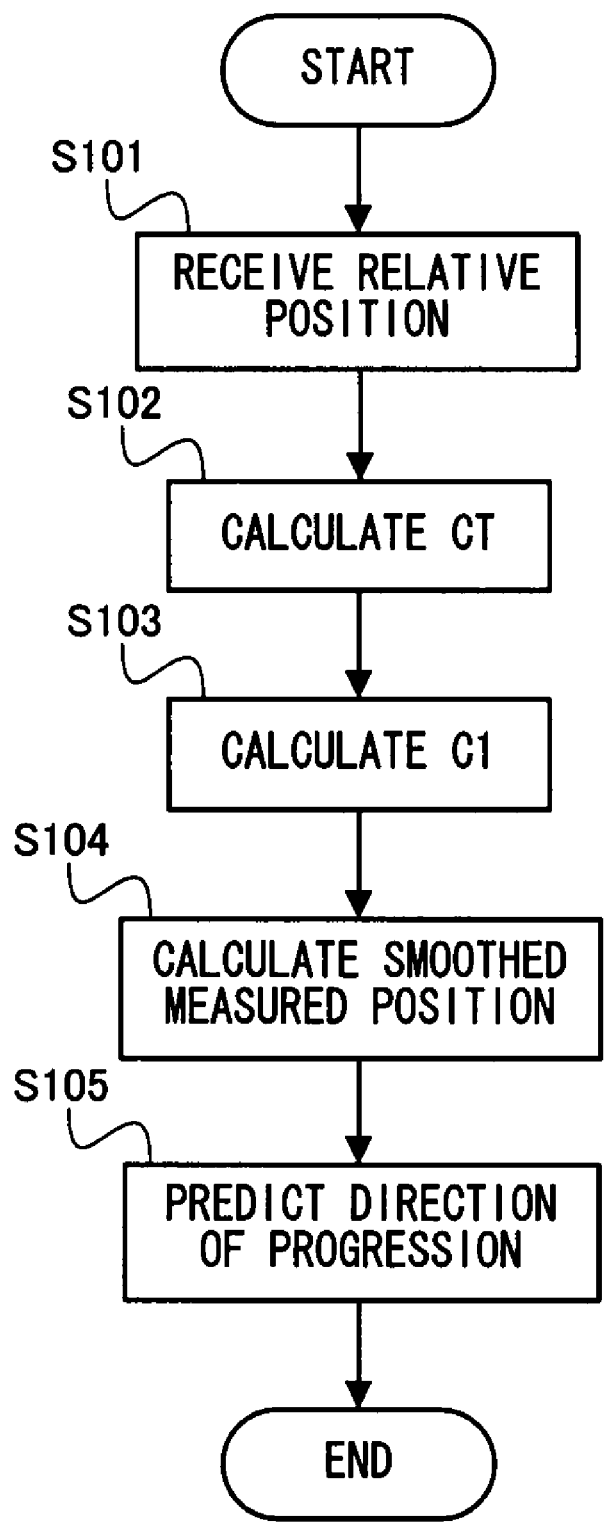
FIG. 7 is a flowchart showing processing performed by an operation section according to the first embodiment.

In the first embodiment described above, every time the operation section 102 performs the processing shown by the flowchart in FIG. 7, the operation section 102 calculates the filter coefficients and then calculates the smoothed lateral distance X(n) and the smoothed longitudinal distance Y(n) by using the calculated filter coefficients. However, the operation section 102 according to the present invention may store the filter coefficients calculated in advance as described in the first embodiment, in accordance with the predicted time CT until collision.

More specifically, first, the operation section 102 calculates in advance the filter coefficients by the calculation method described in the first embodiment to store them in the storage section which is not shown. At this time, two or more types of filter coefficients are calculated. In order that a plurality of types of the filter coefficients can be stored in the order of their characteristics, which change between the filter coefficients having high stability and the filter coefficients having high responsiveness, the filter coefficients C1 are calculated, for example, in increasing order of their sizes, and then stored in advance in the storage section of the operation section 102, which is not shown. In addition, one or more predetermined threshold values are stored in the storage section of the operation section 102, which is not shown. The stored threshold values are to be compared with the predicted time CT until collision. In addition, if two or more types of the threshold values are stored, they are stored in advance, for example, in increasing order of their sizes, in order to select one of the plurality of types of filter coefficients in accordance with the predicted time CT until collision. Then, the operation section 102 calculates the predicted time CT until collision described in the first embodiment, and compares the calculated predicted time CT until collision with the one or more predetermined threshold values. The operation section 102 selects a filter coefficient, based on a result of the comparison of the calculated predicted time CT until collision with the one or more predetermined threshold values. After selecting the filter coefficient, the operation section 102 calculates the smoothed lateral distance X(n) and the smoothed longitudinal distance Y(n) by using the selected filter coefficient, as described in the first embodiment.

Processing performed by the operation section 102 according to the variation of the first embodiment will be described below, with reference to processing shown by a flowchart in FIG. 8. Note that as an example, the processing shown by the flowchart in FIG. 8 uses predetermined three types of filter coefficients C1 stored in the storage section of the operation section 102, which is not shown, the predetermined three types of filter coefficients C1 including filter coefficients C1A, C1B, and C1C, the order of their sizes being C1A, C1B, and then C1C from smallest to largest. Therefore, upon the processing shown by the flowchart in FIG. 8, predetermined two types of threshold values th1 and th2 are stored in the storage section of the operation section 102, which is not shown, in order to select the above filter coefficients in accordance with the predicted time CT until collision, the threshold value th1 being larger than the threshold value th2. Note that when the order of the sizes of the filter coefficients C1 is C1A, C1B, and then C1C from smallest to largest, the order of stability of the calculated smoothed lateral distance X(n) and the calculated smoothed longitudinal distance Y(n) is C1A, C1B, and then C1C from smallest to largest, as is obvious from the description in the first embodiment.

In steps S201 and S202, the operation section 102 performs the same processing as that in steps S101 and S102 described in the first embodiment, and then proceeds to processing in step S203.

In step S203, the operation section 102 determines whether or not the predicted time CT until collision calculated in step S202 is larger than the predetermined threshold value th1. If, in step S203, the operation section 102 determines that the calculated predicted time CT until collision is larger than the predetermined threshold value th1, the operation section 102 proceeds to processing in step S204. On the other hand, if, in step S203, the operation section 102 determines that the calculated predicted time CT until collision is not larger than the predetermined threshold value th1, the operation section 102 proceeds to processing in step S205.

In step S204, the operation section 102 selects the largest filter coefficient C1C, among the predetermined filter coefficients C1. After completing processing in step S204, the operation section 102 proceeds to processing in step S208.

In step S205, the operation section 102 determines whether or not the predicted time CT until collision calculated in step S202 is equal to or smaller than the threshold value th1 and is larger than the threshold value th2. If, in step S205, the operation section 102 determines that the calculated predicted time CT until collision is equal to or smaller than the threshold value th1 and is larger than the threshold value th2, the operation section 102 proceeds to processing in step S206. On the other hand, if the operation section 102 determines that the calculated predicted time CT until collision is not equal to or smaller than the threshold value th1 and is not larger than the threshold value th2, the operation section 102 proceeds to processing in step S207.

In step S206, the operation section 102 selects the second largest filter coefficient C1B after the filter coefficient C1C, among the predetermined filter coefficients C1. After completing processing in step S206, the operation section 102 proceeds to processing in step S208.

In step S207, the operation section 102 determines that the predicted time CT until collision calculated in step S202 is equal to or smaller than the threshold value th2, and selects the smallest filter coefficient C1A, among the predetermined filter coefficients C1. After completing processing in step S207, the operation section 102 proceeds to processing in step S208.

In step S208, the operation section 102 performs the same operations as those in step S104 described in the first embodiment by using selected filter coefficient C1, thereby calculating the smoothed measured position (smoothed lateral distance X(n) and smoothed longitudinal distance Y(n)), the lateral velocity Vx(n), and the longitudinal velocity Vy(n). After completing processing in step S208, the operation section 102 proceeds to processing in step S209.

In step S209, the operation section 102 performs the same processing as that in step S105 described in the first embodiment, thereby predicting a direction of progression of the other vehicle, and generating progression direction information indicating the predicted direction of progression. After completing processing in step S209, the operation section 102 returns to processing in step S201.

The above is the description of the radar apparatus 1 according to the variation of the first embodiment. Note that processing other than the above-described processing, performed by the operation section 102 according to the variation of the first embodiment is the same as the corresponding processing in the first embodiment. Therefore, the description thereof is omitted. By performing the processing shown by the flowchart in FIG. 8, the radar apparatus 1 according to the variation of the first embodiment selects the filter coefficients in accordance with the predicted time CT until collision, and thus can optimize the characteristic of the filter processing between stability and responsiveness in accordance with the predicted time CT until collision, as in the radar apparatus 1 according to the first embodiment. Moreover, the radar apparatus 1 according to the variation of the first embodiment selects one of a plurality of predetermined types of filter coefficients C1 to perform the filter processing. Therefore, the radar apparatus 1 can predict a direction of progression of the other vehicle, based on a smoothed measured position obtained by the filter processing having an optimum characteristic, with a load of the operations being smaller than in the first embodiment, without performing the operation of the expression (6) described in the first embodiment. In addition, the radar apparatus 1 can prevent erroneous determination from being performed by an apparatus, such as the aforementioned collision safety apparatus 201, provided at a stage subsequent to the radar apparatus 1.

Note that in the description of the variation of the first embodiment, the filter coefficient having higher stability (larger filter coefficient C1) being selected as the predicted time CT until collision increases means that the filter coefficient having higher responsiveness (smaller filter coefficient C1) is selected as the predicted time CT until collision decreases.

Second Embodiment

Figure 9:
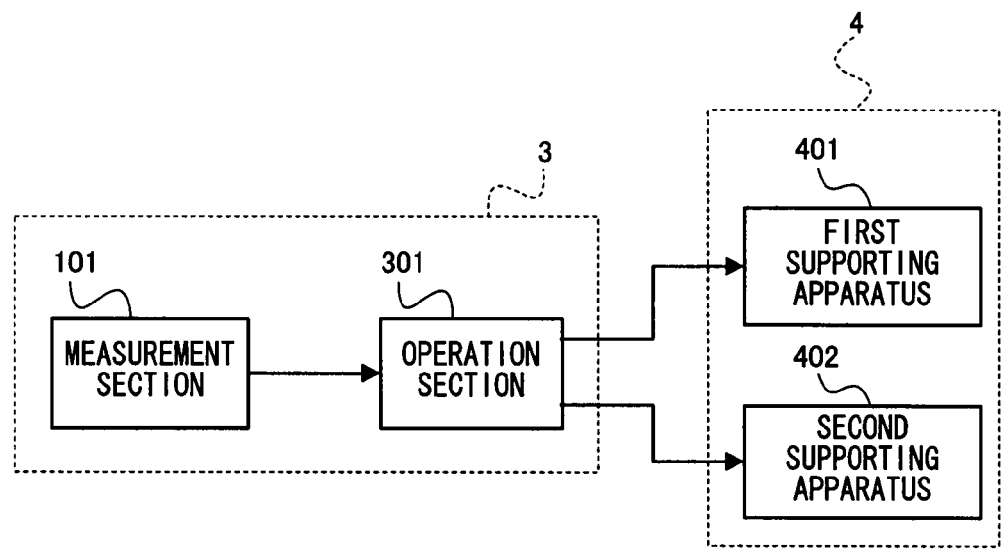
FIG. 9 is a block diagram showing a schematic configuration of a radar apparatus according to a second embodiment.

FIG. 9 is a block diagram showing schematic configurations of a radar apparatus 3 and a supporting apparatus 4 according to a second embodiment of the present invention. The first embodiment and the second embodiment are different in that while the supporting apparatus 2 provided at a stage subsequent to the radar apparatus 1 includes only one apparatus, which is the collision safety apparatus 201, the supporting apparatus 4 provided at a stage subsequent to the radar apparatus 3 includes two apparatuses, which are a first supporting apparatus 401 and a second supporting apparatus 402. Note that among components shown in FIG. 9, components which operate in the same manner as the components described in the first embodiment are denoted by the same reference numerals as in the first embodiment, and the description thereof is omitted.

First, the first supporting apparatus 401, similarly to the collision safety apparatus 201 described in the first embodiment, determines a possibility of collision of the own vehicle and the other vehicle and thereby enhances safety, based on: a direction of progression of the other vehicle predicted by the operation section 301; a direction of progression of the own vehicle estimated by another apparatus which is not shown using a known method; a predicted time until collision calculated by the operation section 301; and the like.

Any apparatus may be used as the second supporting apparatus 402 as long as the apparatus is capable of performing processing based on: a smoothed measured position calculated by the operation section 102; a direction of progression of the own vehicle estimated by another apparatus which is not shown using a known method; and the like. One example of such an apparatus is an inter-vehicular distance maintaining apparatus which controls an opening degree of an accelerator so as to maintain, at a predetermined distance, the distance between the own vehicle and a preceding vehicle running on the same lane as the own vehicle.

The first supporting apparatus 401 and the second supporting apparatus 402 are different at least in that while the first supporting apparatus 401 performs processing based on a direction of progression of the other vehicle predicted by the operation section 301, the second supporting apparatus 402 performs processing based on a smoothed lateral distance and a smoothed longitudinal distance calculated by the operation section 301. Moreover, a characteristic of filter processing used for the operation section 301 to calculate a smoothed lateral distance and a smoothed longitudinal distance used for predicting a direction of progression which is used for the first supporting apparatus 401 to perform processing, can be different from a characteristic of filter processing used for the operation section 301 to calculate a smoothed lateral distance and a smoothed longitudinal distance used for the second supporting apparatus 402 to perform processing.

Therefore, the operation section 301 according to the second embodiment calculates a smoothed lateral distance and a smoothed longitudinal distance as described in the first embodiment by using a predetermined filter coefficient C1 to be used for the second supporting apparatus 402 to perform processing. Moreover, upon prediction of a direction of progression of the other vehicle which is needed for the first supporting apparatus 401 to perform processing, the operation section 301 according to the second embodiment predicts the direction, based on a mixed measured position obtained by filter processing in which the latest measured position and the latest smoothed measured position calculated are mixed with each other at a mixing ratio described later.

After calculating a smoothed measured position indicated by the smoothed lateral distance X(n) and the smoothed longitudinal distance Y(n) by using the predetermined filter coefficient C1 as described in the first embodiment, the operation section 301 performs the operations of the following expressions (7) to (9) on the smoothed lateral distance X(n) and the smoothed longitudinal distance Y(n) of the calculated smoothed measured position, thereby performing the filter processing in which the smoothed lateral distance X(n) and the smoothed longitudinal distance Y(n) are mixed with the lateral distance and the longitudinal distance of the latest measured position, respectively.

$$AX(n) = (1 - C2) \cdot Xin + C2 \cdot X(n) \qquad (7)$$

$$AY(n) = (1 - C2) \cdot Yin + C2 \cdot Y(n) \qquad (8)$$

$$C2 = \frac{k2}{T2}(CT - Vstart2) \qquad (9)$$

First, the operation of the expression (7) will be described. The operation section 301 performs the operation of the expression (7) to mix the latest smoothed lateral distance X(n) and the lateral distance of the latest measured position which are stored in the storage section, which is not shown. In the expression (7), AX(n) indicates the latest mixed lateral distance obtained by mixing the latest smoothed lateral distance X(n) and the lateral distance of the latest measured position, C2 indicates a mixing ratio, and Xin indicates the lateral distance of the latest measured position described in the first embodiment. As is obvious from the expression (7), the operation section 301 performs filter processing of mixing the latest smoothed lateral distance X(n) and the lateral distance Xin of the latest measured position, by summing the latest smoothed lateral distance X(n) multiplied by the mixing ratio C2, and the lateral distance Xin multiplied by a mixing ratio (1−C2), thereby calculating the latest mixed lateral distance AX(n). After calculating the latest mixed lateral distance AX(n), the operation section 301 stores the calculated mixed lateral distance AX(n) in the storage section, which is not shown. The above is the description of the operation of the expression (7). Note that the mixing ratio C2 and the mixing ratio (1−C2) correspond to filter coefficients used for performing filter processing of mixing the latest smoothed lateral distance X(n) and the lateral distance Xin of the latest measured position.

Next, the operation of the expression (8) will be described. The operation section 301 performs the operation of the expression (8) to mix the latest smoothed longitudinal distance Y(n) and the longitudinal distance of the latest measured position which are stored in the storage section, which is not shown. In the expression (8), AY(n) indicates the latest mixed longitudinal distance obtained by mixing the latest smoothed longitudinal distance Y(n) and the longitudinal distance of the latest measured position, C2 indicates the aforementioned mixing ratio, and Yin indicates the longitudinal distance of the latest measured position described in the first embodiment. As is obvious from the expression (8), the operation section 301 performs filter processing of mixing the latest smoothed longitudinal distance Y(n) and the longitudinal distance Yin of the latest measured position, by summing the latest smoothed longitudinal distance Y(n) multiplied by the mixing ratio C2, and the longitudinal distance Yin multiplied by a mixing ratio (1−C2), thereby calculating the latest mixed longitudinal distance AY(n). After calculating the latest mixed longitudinal distance AY(n), the operation section 301 stores the calculated mixed longitudinal distance AY(n) in the storage section, which is not shown. The above is the description of the operation of the expression (8). Note that the mixing ratio C2 and the mixing ratio (1−C2) correspond to filter coefficients used for performing filter processing of mixing the latest smoothed longitudinal distance Y(n) and the longitudinal distance Yin of the latest measured position. In addition, the aforementioned mixed measured position is a position indicated by the mixed lateral distance AX(n) and the mixed longitudinal distance AY(n).

Next, in order to describe the operation of the expression (9), first, changes of respective values calculated by the operations of the expressions (7) and (8), which are caused by a change of the mixing ratio C2, will be described. If the operation section 301 changes C2 to calculate the mixed lateral distance AX(n), the calculated mixed lateral distance AX(n) changes as described below. Specifically, upon calculation of the mixed lateral distance AX(n) through the operation of the expression (7), if the operation section 301 decreases the mixing ratio C2, by which the smoothed lateral distance X(n) is to be multiplied, so that the mixing ratio (1−C2), by which the latest lateral distance Xin is to be multiplied, relatively increases, the latest lateral distance Xin is relatively largely reflected in the calculated mixed lateral distance AX(n). Therefore, if the operation section 301 decreases the filter coefficient C2 so that the filter coefficient (1−C2), by which the latest lateral distance Xin is to be multiplied, relatively increases, and then performs the operation of the expression (7), the mixed lateral distance AX(n) having high responsiveness, which is close to the current actual lateral distance to the other vehicle, can be calculated.

On the other hand, upon calculation of the mixed lateral distance AX(n) through the operation of the expression (7), if the operation section 301 increases the mixing ratio C2, by which the smoothed lateral distance X(n) is to be multiplied, so that the mixing ratio (1−C2), by which the latest lateral distance Xin is to be multiplied, relatively decreases, the smoothed lateral distance X(n) is relatively largely reflected in the calculated mixed lateral distance AX(n). Therefore, if the operation section 301 increases the filter coefficient C2, by which the smoothed lateral distance X(n) is to be multiplied, and then performs the operation of the expression (7), the mixed lateral distance AX(n) in which the smoothed lateral distance X(n) is relatively largely reflected in comparison with the current actual lateral distance to the other vehicle, the mixed lateral distance AX(n) having high stability, can be calculated.

Similarly, also upon calculation of the mixed longitudinal distance AY(n) through the operation of the expression (8), if the operation section 301 decreases the mixing ratio C2, by which the smoothed longitudinal distance Y(n) is to be multiplied, so that the mixing ratio (1−C2), by which the latest longitudinal distance Yin is to be multiplied, relatively increases, the mixed longitudinal distance AY(n) having high responsiveness, which is relatively close to the current actual longitudinal distance to the other vehicle, can be calculated. On the other hand, upon calculation of the mixed longitudinal distance AY(n) through the operation of the expression (8), if the operation section 301 increases the filter coefficient C2, by which the smoothed longitudinal distance Y(n) is to be multiplied, the mixed longitudinal distance AY(n) in which the smoothed longitudinal distance Y(n) is relatively largely reflected in comparison with the current actual longitudinal distance to the other vehicle, the mixed longitudinal distance AY(n) having high stability, can be calculated.

Note that hereinafter, the filter coefficients (C2 and (1−C2)) which allow the mixed lateral distance AX(n) having high responsiveness and the mixed longitudinal distance AY(n) having high responsiveness, to be calculated as described above, are referred to as filter coefficients having high responsiveness. More specifically, if the filter coefficient (1−C2) is equal to or larger than the filter coefficient C2, the filter coefficient (1−C2) and the filter coefficient C2 are referred to as filter coefficients having high responsiveness. In addition, the filter coefficients (C2 and (1−C2)) which allow the mixed lateral distance AX(n) having high stability and the mixed longitudinal distance AY(n) having high stability, to be calculated as described above, are referred to as filter coefficients having high stability. More specifically, if the filter coefficient C2 is larger than the filter coefficient (1−C2), the filter coefficient (1−C2) and the filter coefficient C2 are referred to as filter coefficients having high stability.

The operation section 301 according to the second embodiment changes, as a filter coefficient, the mixing ratio (C2, (1−C2)) used for calculation of the mixed lateral distance AX(n) and the mixed longitudinal distance AY(n), without changing the filter coefficient C1 used for calculation of the smoothed lateral distance X(n) and the smoothed longitudinal distance Y(n), and thereby can calculate a lateral distance and a longitudinal distance having high responsiveness, or a lateral distance and a longitudinal distance having high stability as in the operation section 102 according to the first embodiment. That is, the operation section 301 according to the second embodiment changes the mixing ratio (C2, (1−C2)) to perform filter processing without changing the filter coefficient C1, and thereby can change the characteristic of the filter processing between stability and responsiveness upon calculation of the mixed lateral distance AX(n) and the mixed longitudinal distance AY(n).

Moreover, the operation section 301 according to the second embodiment needs to selectively use the mixing ratio, based on the relative distance to the other vehicle and the relative velocity of the other vehicle, for the same reason as in the first embodiment, that is, in order to prevent the first supporting apparatus 401 described above from erroneously determining that there is a high possibility that the own vehicle and the other vehicle will collide with each other. Moreover, the operation section 301 uses the expression (9) for, based on the relative distance to the other vehicle and the relative velocity of the other vehicle, calculating and selectively using the mixing ratio.

Figure 10:
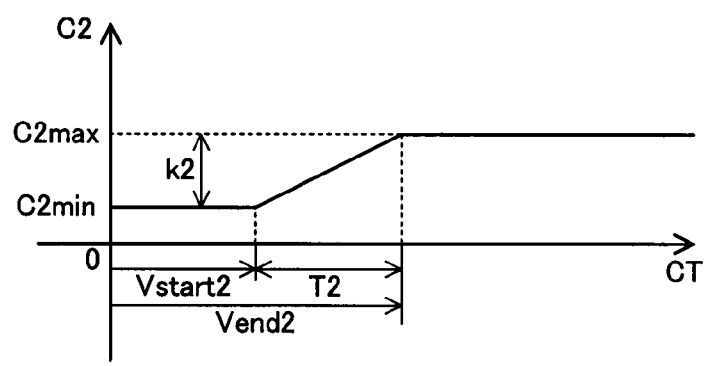
FIG. 10 is a diagram showing an example of a relationship between a mixing ratio and a predicted time until collision.

In the expression (9), C2 is the mixing ratio C2 in the expression (7) and the expression (8), and CT indicates the predicted time until collision described in the first embodiment. By the operation section 301 performing an operation of the expression (9), the mixing ratio C2 is calculated so as to increase by k2 per a predetermined time period T2 when it is assumed that the predicted time CT until collision continues to increase. Here, the mixing ratio C2 has predetermined lower and upper limits. FIG. 10 is a diagram showing an example of a relationship between the predicted time CT until collision and the mixing ratio C2 calculated by the operation section 301 performing the operation of the expression (9). C2min shown in FIG. 10 is the predetermined lower limit of the mixing ratio C2, and C2max is the predetermined upper limit of the mixing ratio C2. In addition, when it is assumed that the predicted time CT until collision continues to increase from zero, Vstart2 shown in FIG. 10 is a predetermined predicted time until collision at a point where the mixing ratio C2 starts to increase from the lower limit C2min, and Vend2 is a predetermined predicted time until collision at a point where the mixing ratio C2 reaches the upper limit C2max after the predicted time CT until collision further continues to increase. Note that the lower limit value C2min and the upper limit value C2max may be any values. Typically, the lower limit value C2min is set at zero, and the upper limit value C2max is set at 1.

By performing the operation of the expression (9) to calculate the mixing ratio C2, when the predicted time CT until collision is relatively large and the own vehicle and the other vehicle are relatively distant from each other, the relatively large mixing ratio C2 is calculated and the mixing ratio (1−C2) is relatively small. Therefore, the mixing ratio having relatively high stability can be calculated as filter coefficients. On the other hand, by performing the operation of the expression (9) to calculate the mixing ratio C2, when the predicted time CT until collision is relatively small and the own vehicle and the other vehicle are relatively close to each other, the relatively small mixing ratio C2 is calculated and the mixing ratio (1−C2) is relatively large. Therefore, the mixing ratio having relatively high responsiveness can be calculated as filter coefficients. That is, similarly to the operation section 102 according to the first embodiment, the operation section 301 according to the present embodiment can optimize the characteristic of the filter processing between stability and responsiveness, in accordance with the predicted time CT until collision.

The above is the description of processing in which the operation section 301 performs filter processing on the latest smoothed lateral distance X(n) and the latest smoothed longitudinal distance Y(n) through the operations of the expressions (7) to (9), thereby calculating the mixed measured position indicated by the mixed lateral distance AX(n) and the mixed longitudinal distance AY(n). After calculating the mixed lateral distance AX(n) and the mixed longitudinal distance AY(n), the operation section 301 according to the second embodiment predicts a direction of progression of the other vehicle by the method described in the first embodiment, by using the mixed measured position indicated by the mixed lateral distance AX(n) and the mixed longitudinal distance AY(n), instead of the smoothed measured position described in the first embodiment.

After predicting a direction of progression of the other vehicle, the operation section 301 generates progression direction information indicating the predicted direction of progression. In addition, after calculating the smoothed measured position, the operation section 301 generates smoothed measured position information indicating the calculated smoothed measured position. Moreover, when the progression direction information is generated by the operation section 301, the first supporting apparatus 401 receives the generated progression direction information, and performs processing as described above, based on the direction of progression indicated by the received progression direction information. On the other hand, the second supporting apparatus 402, when the smoothed measured position information is generated by the operation section 301, receives the generated smoothed measured position information, and performs processing as described above, based on the smoothed measured position indicated by the received smoothed measured position information.

Next, processing performed by the operation section 301 according to the present embodiment will be described with reference to a flowchart shown in FIG. 11. Note that the operation section 301 starts the processing shown by the flowchart in FIG. 11 at the same timing as the timing when the operation section 102 described in the first embodiment starts the processing shown by the flowchart in FIG. 7.

In steps S301 and S302, the operation section 301 performs the same processing as that in steps S101 and S102 described in the first embodiment, and then proceeds to processing in step S303. In step S303, the operation section 301 performs the same processing as that in step S103 described in the first embodiment by using the predetermined filter coefficient C1, thereby calculating the smoothed measured position. In step S303, after calculating the smoothed measured position, the operation section 301 generates smoothed measured position information indicating the calculated smoothed measured position. After completing processing in step S303, the operation section 301 proceeds to processing in step S304.

In step S304, the operation section 301 substitutes the predicted time CT until collision calculated in step S302 into the expression (9), thereby calculating the mixing ratio C2. Note that when the calculated mixing ratio C2 is larger than the aforementioned upper limit, the operation section 301 changes the calculated mixing ratio C2 to the upper limit. On the other hand, when the calculated mixing ratio C2 is smaller than the aforementioned lower limit, the operation section 301 changes the calculated mixing ratio C2 to the lower limit. After completing processing in step S304, the operation section 301 proceeds to processing in step S305.

In step S305, the operation section 301 performs the operations of the expressions (7) to (8) by using the mixing ratio C2 calculated in step S304, thereby calculating the mixed measured position. After completing processing in step S305, the operation section 301 proceeds to processing in step S306.

In step S306, as described above, the operation section 301 predicts a direction of progression of the other vehicle through the same processing as in step S105, by using the mixed measured position indicated by the mixed lateral distance AX(n) and the mixed longitudinal distance AY(n) calculated in step S305, instead of using the smoothed measured position described in the first embodiment. In step S306, after predicting the direction of progression of the other vehicle, the operation section 301 generates the progression direction information indicating the predicted direction of progression. After completing processing in step S306, the operation section 301 returns to processing in step S301.

The above is the description of the operation section 301 according to the present embodiment. Even if a plurality of apparatuses using different characteristics (responsiveness and stability) including a characteristic for calculating the smoothed measured position indicated by the smoothed measured position information, and a characteristic for calculating the smoothed measured position used for predicting the direction of progression indicated by the progression direction information, are provided at a stage subsequent to the radar apparatus 3, the radar apparatus 3 according to the second embodiment can generate, for an apparatus which needs the smoothed measured position information, the smoothed measured position information indicating the smoothed measured position calculated by using the filter coefficients suitable for the apparatus, and can generate, for an apparatus which needs the progression direction information, the progression direction information indicating the direction of progression predicted based on the mixed measured position calculated by using a characteristic suitable for the apparatus. Moreover, the radar apparatus 3 according to the second embodiment can generate, for the apparatus which needs the progression direction information, the progression direction information indicating the direction of progression predicted based on the mixed measured position calculated by using a characteristic suitable for the apparatus, and similarly to the first embodiment, can prevent erroneous determination from being performed by an apparatus, such as the first supporting apparatus 401, provided at a stage subsequent to the radar apparatus 3.

Variation of Second Embodiment

Figure 11:
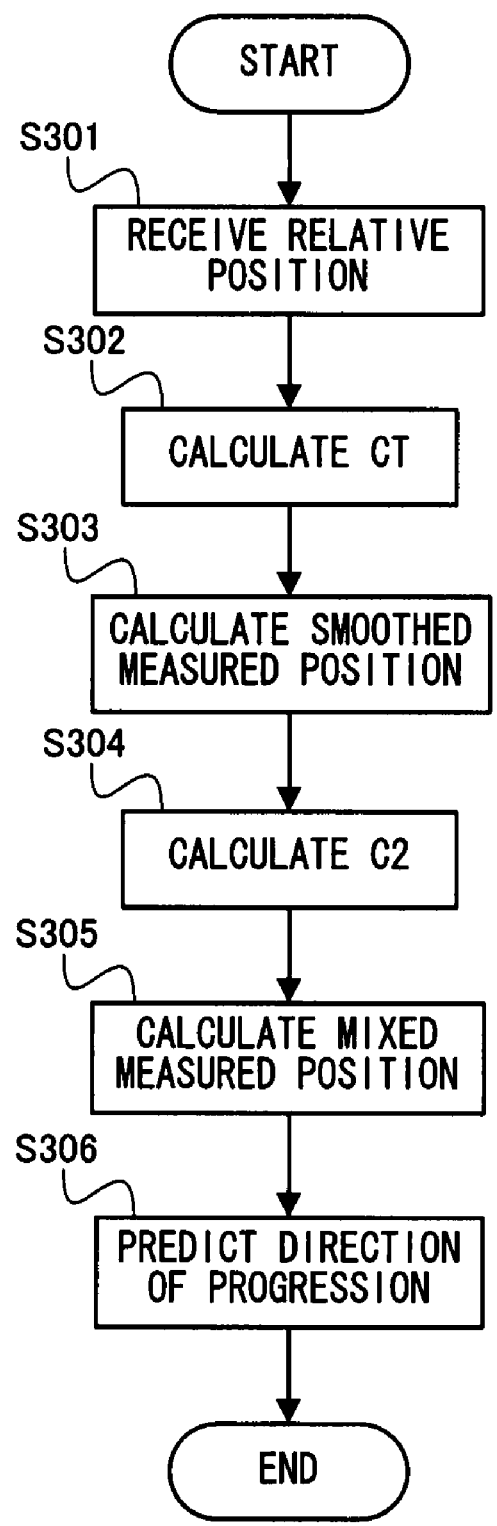
FIG. 11 is a flowchart showing processing performed by an operation section according to the second embodiment.

In the second embodiment described above, every time the operation section 301 performs the processing shown by the flowchart in FIG. 11, the operation section 301 calculates a mixing ratio, and calculates the mixed lateral distance AX(n) and the mixed longitudinal distance AY(n) by using the calculated mixing ratio. However, the operation section 301 according to the present invention may store in advance the mixing ratio calculated as described in the second embodiment, in accordance with the predicted time CT until collision.

More specifically, first, the operation section 301 calculates in advance the mixing ratio by the calculation method described in the second embodiment to store them in the storage section which is not shown. At this time, two or more types of mixing ratios are calculated. In order that a plurality of types of the mixing ratios can be stored in the order of their characteristics, which change between the mixing ratios having high stability and the mixing ratios having high responsiveness, the mixing ratios C2 are calculated, for example, in increasing order of their sizes, and then stored in the storage section of the operation section 301, which is not shown. In addition, one or more predetermined threshold values are stored in the storage section of the operation section 301, which is not shown. The stored threshold values are to be compared with the predicted time CT until collision. In addition, if two or more types of the threshold values are stored, they are stored in advance, for example, in increasing order, in order to select one of the plurality of types of the mixing ratios in accordance with the predicted time CT until collision. Then, the operation section 301 calculates the predicted time CT until collision described in the second embodiment, and compares the calculated predicted time CT until collision with the one or more predetermined threshold values. The operation section 301 selects a mixing ratio, based on a result of the comparison of the calculated predicted time CT until collision with the one or more predetermined threshold values. After selecting the mixing ratio, the operation section 301 calculates the mixed lateral distance AX(n) and the mixed longitudinal distance AY(n) by using the selected mixing ratio, as described in the second embodiment.

Figure 12:
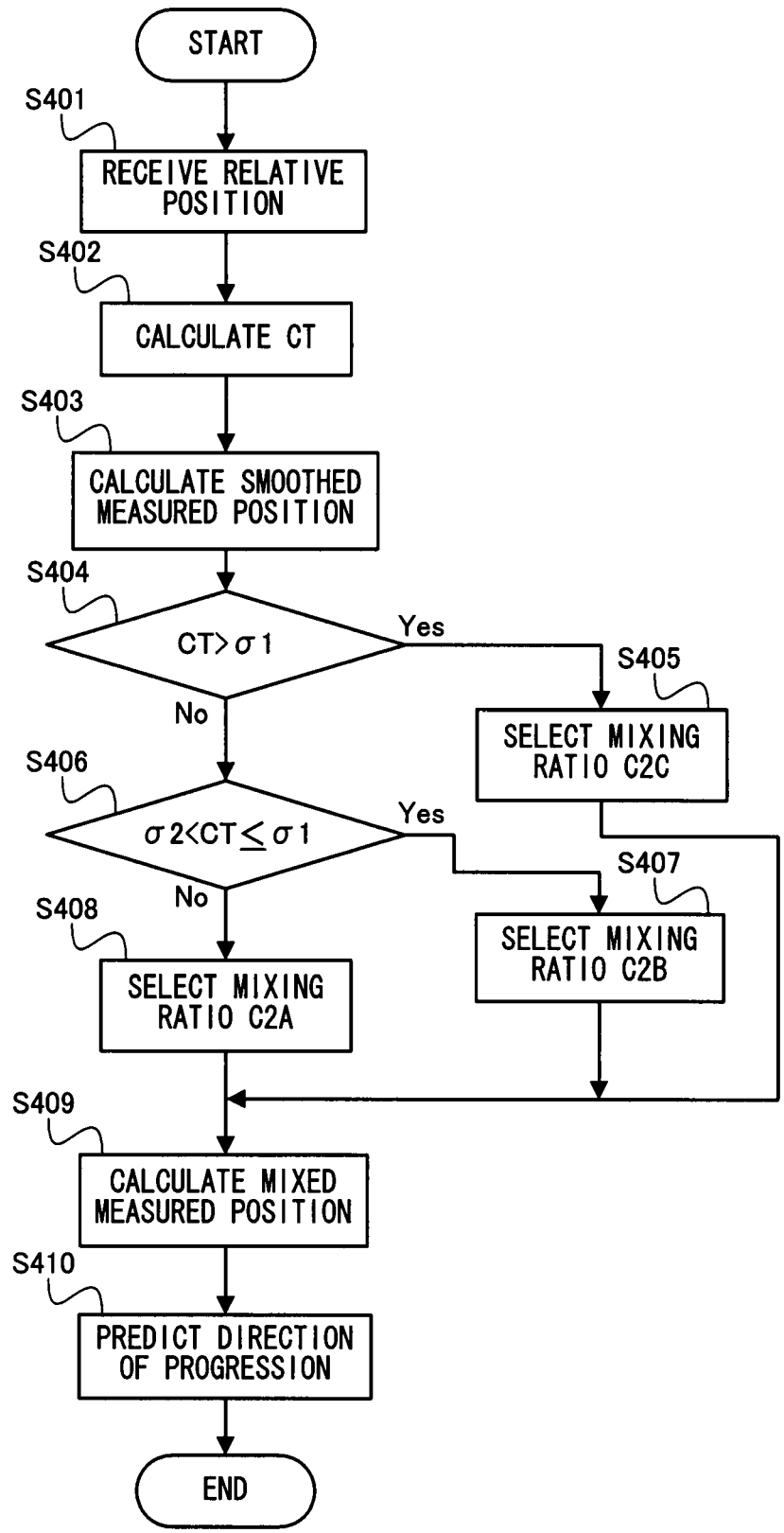
FIG. 12 is a flowchart showing processing performed by an operation section according to a variation of the second embodiment.

Processing performed by the operation section 301 according to the variation of the second embodiment will be described below, with reference to processing shown by a flowchart in FIG. 12. Note that as an example, the processing shown by the flowchart in FIG. 12 uses predetermined three types of mixing ratios C2 stored in the storage section of the operation section 301, which is not shown, the predetermined three types of mixing ratios C2 including mixing ratios C2A, C2B, and C2C, the order of their sizes being C2A, C2B, and then C2C from smallest to largest. Therefore, upon the processing shown by the flowchart in FIG. 12, predetermined two types of threshold values σ1 and σ2 are also stored in the storage section of the operation section 301, which is not shown, in order to select the above mixing ratios C2 in accordance with the predicted time CT until collision, the threshold value σ2 being smaller than the threshold value σ1. Note that when the order of the sizes of the mixing ratios C2 is C2A, C2B, and then C2C from smallest to largest, the order of stability of the calculated mixed lateral distance AX(n) and the calculated mixed longitudinal distance AY(n) is C2A, C2B, and then C2C from smallest to largest, as is obvious from the description in the second embodiment.

In steps S401 and S402, the operation section 301 performs the same processing as that in steps S201 and S202 described in the variation of the first embodiment, and then proceeds to processing in step S403.

In step S403, the operation section 301 performs the same processing as those in step S103 described in the first embodiment by using a predetermined filter coefficient C1, thereby calculating the smoothed measured position. In step S403, after calculating the smoothed measured position, the operation section 301 generates smoothed measured position information indicating the calculated smoothed measured position. After completing processing in step S403, the operation section 301 proceeds to processing in step S404.

In step S404, the operation section 301 determines whether or not the predicted time CT until collision calculated in step S402 is larger than the predetermined threshold value σ1. If, in step S404, the operation section 301 determines that the calculated predicted time CT until collision is larger than the predetermined threshold value σ1, the operation section 301 proceeds to processing in step S405. On the other hand, if, in step S404, the operation section 301 determines that the calculated predicted time CT until collision is not larger than the predetermined threshold value σ1, the operation section 301 proceeds to processing in step S406.

In step S405, the operation section 301 selects the largest mixing ratio C2C, among the predetermined mixing ratios C2. After completing processing in step S405, the operation section 301 proceeds to processing in step S409.

In step S406, the operation section 301 determines whether or not the predicted time CT until collision calculated in step S402 is equal to or smaller than the threshold value σ1 and is larger than the threshold value σ2. If, in step S406, the operation section 301 determines that the calculated predicted time CT until collision is equal to or smaller than the threshold value σ1 and is larger than the threshold value σ2, the operation section 301 proceeds to processing in step S407. On the other hand, if the operation section 301 determines that the calculated predicted time CT until collision is not equal to or smaller than the threshold value σ1 and is not larger than the threshold value σ2, the operation section 301 proceeds to processing in step S408.

In step S407, the operation section 301 selects the second largest mixing ratio C2B after the mixing ratio C2C, among the predetermined mixing ratios C2. After completing processing in step S407, the operation section 301 proceeds to processing in step S409.

In step S408, the operation section 301 determines that the predicted time CT until collision calculated in step S402 is equal to or smaller than the threshold value σ2, and selects the smallest mixing ratio C2A, among the predetermined mixing ratios C2. After completing processing in step S408, the operation section 301 proceeds to processing in step S409.

In step S409, the operation section 301 performs the same operations as those in step S305 described in the second embodiment by using selected mixing ratio C2, thereby calculating the mixed lateral distance AX(n) and the mixed longitudinal distance AY(n). After completing processing in step S409, the operation section 301 proceeds to processing in step S410.

In step S410, the operation section 301 performs the same processing as that in step S306 described in the second embodiment, thereby predicting a direction of progression of the other vehicle, and generating progression direction information indicating the predicted direction of progression. After completing processing in step S410, the operation section 301 returns to processing in step S401.

The above is the description of processing performed by the operation section 301 according to the variation of the second embodiment. Note that processing other than the above-described processing, performed by the operation section 301 according to the variation of the second embodiment is the same as the corresponding processing in the second embodiment. Therefore, the description thereof is omitted. By performing the processing shown by the flowchart in FIG. 12, the radar apparatus 3 according to the variation of the second embodiment selects the mixing ratios having higher stability as the predicted time CT until collision increases. Thus, the radar apparatus 3 can generate, for an apparatus which needs the progression direction information, the progression direction information indicating the direction of progression predicted based on the mixed measured position calculated by using a characteristic suitable for the apparatus, as in the radar apparatus 2 according to the second embodiment, and prevents erroneous determination from being performed by an apparatus, such as the first supporting apparatus 401, provided at a stage subsequent to the radar apparatus 3. Moreover, the radar apparatus 3 according to the variation of the second embodiment selects one of predetermined mixing ratios C2 to perform the filter processing. Therefore, the radar apparatus 3 can predict a direction of progression of the other vehicle, based on a mixed measured position obtained by the filter processing having an optimum characteristic, with a load of the operations being smaller than in the second embodiment, without performing the operation of the expression (9) described in the second embodiment.

Note that in the description of the variation of the second embodiment, the mixing ratio having higher stability (larger mixing ratio C2) being selected as the predicted time CT until collision increases means that the mixing ratio having higher responsiveness (smaller mixing ratio C2) is selected as the predicted time CT until collision decreases.

Note that in another embodiment, the smoothed lateral distance X(n), the smoothed longitudinal distance Y(n), the lateral velocity Vx(n), and the longitudinal velocity Vy(n) may be calculated by using different filter coefficients so that characteristics used for those values, i.e., responsiveness or stability described above, are different from each other, instead of using the identical filter coefficient C1 as shown in the expressions (2) to (5) described in the first embodiment.

In addition, in another embodiment, the mixed lateral distance AX(n) and the mixed longitudinal distance AY(n) may be calculated by using different mixing ratios as filter coefficients so that characteristics used for those values, i.e., responsiveness or stability described above, are different from each other, instead of using the identical mixing ratio C2 as a filter coefficient as shown in the expressions (7) and (8) described in the second embodiment.

In addition, the filter processing of performing the operations of the expressions (2) to (5) described in the first embodiment, and the filter processing of performing the operations of the expressions (7) and (8) described in the second embodiment are just examples. Any filter processing may be used as long as the characteristic of the filter processing can be changed between stability and responsiveness by changing the filter coefficient as described in the above embodiments. Examples of filters used for such filter processing are a Bessel filter, a Butterworth filter, a type-I Chebyshev filter, an Elliptic filter, and the like.

In addition, in order to change the characteristic of filter processing between stability and responsiveness as described in the first embodiment, the smoothed lateral distance X(n) and the smoothed longitudinal distance Y(n) may be calculated by filter processing while the filter processing being switched in accordance with the predicted time CT until collision. In addition, in order to change, between stability and responsiveness, the characteristic of the filter processing used for mixing as described in the second embodiment, the mixed lateral distance X(n) and the mixed longitudinal distance Y(n) may be calculated by filter processing while the filter processing being switched in accordance with the predicted time CT until collision.

In addition, in another embodiment of the present invention, a predicted time until collision may be calculated by another method which is considered to be capable of estimating a time until the own vehicle and the other vehicle collide with each other, instead of calculating a predicted time until collision by dividing a relative distance indicated by the latest relative position information by a relative velocity indicated by the latest relative velocity information as described in the above embodiments.

In addition, in another embodiment of the present invention, another expression for changing the characteristic between responsiveness and stability in accordance with a predicted time until collision may be used for calculation of a filter coefficient, instead of the expressions (6) and (9) described in the first embodiment and the second embodiment, respectively. Here, the upper limit value and the lower limit value of filter coefficient described above are not necessarily set.

In addition, in the first embodiment and the variation thereof, the supporting apparatus 2 includes only the collision safety apparatus 201. However, the supporting apparatus 2 may include one or more apparatuses, e.g., an apparatus, such as the collision safety apparatus 201, for enhancing safety of a driver, a passenger, and a pedestrian, and a driving supporting apparatus for reducing a burden of driving on a driver, such as a lane keeping apparatus for controlling a steering torque so as to progress along a lane on which the own vehicle is running.

In addition, the expressions for calculating the smoothed lateral distance X(n) and the smoothed longitudinal distance Y(n) described in the first embodiment are just examples. Other expressions may be used as long as the expressions allow the characteristic to be changed between stability and responsiveness by changing the filter coefficient C1.

In addition, in the present invention, a radar apparatus including one measurement section is described as an example. However, a radar apparatus according to the present invention may be configured so as to measure an object by using a plurality of measurement sections, and to perform processing as described in the above embodiments by using one operation section, based on relative position information and relative velocity information generated by the plurality of measurement sections.

Figure 13:
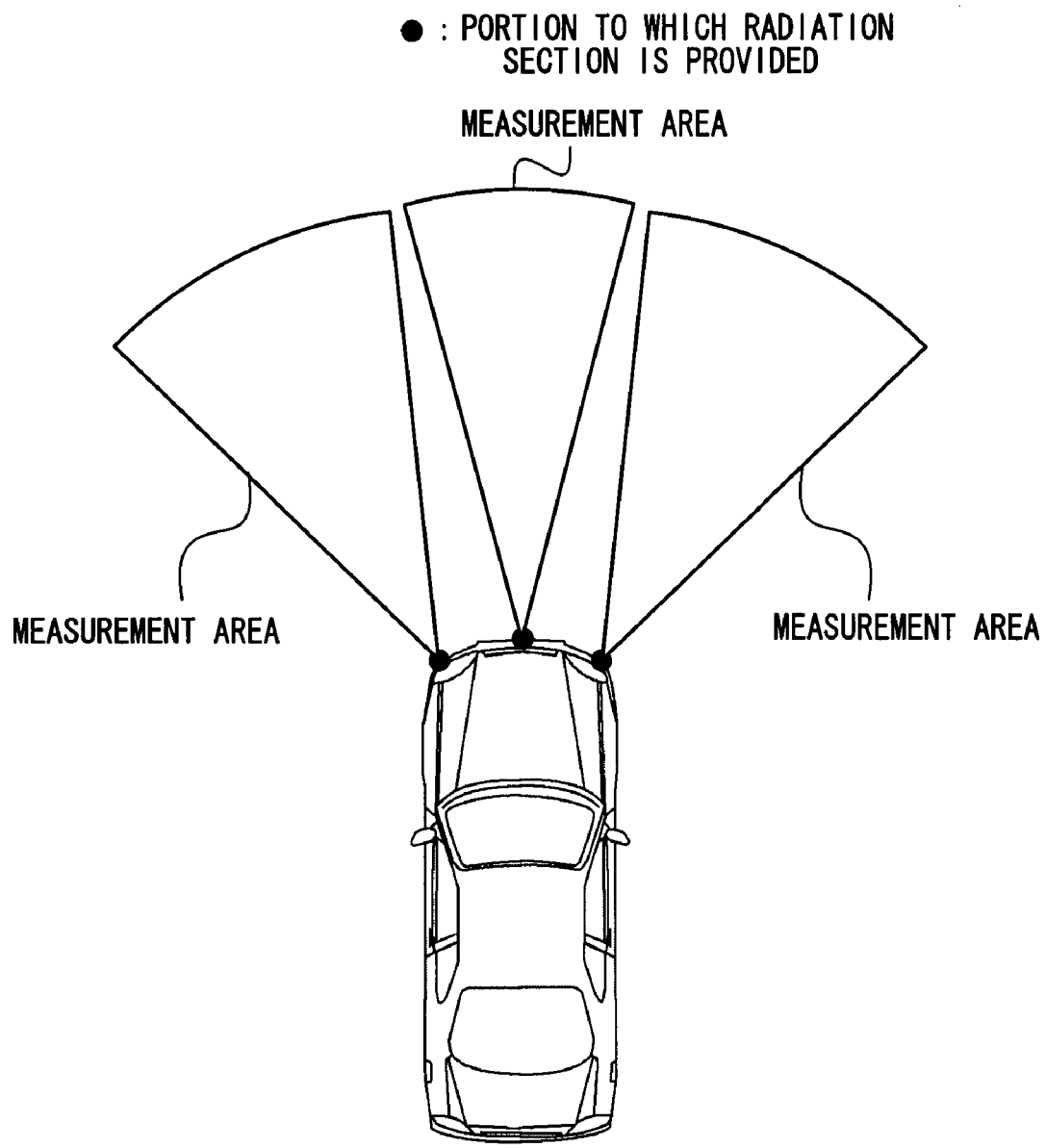
FIG. 13 is a diagram showing an example of a portion to which a radiation section and a reception section of a measurement section of a radar apparatus according to the present invention are provided.

In addition, in the present invention, for example, the own vehicle may have a plurality of radar apparatuses each integrally including the operation section and the measurement section described in the above embodiments, and radiation sections for radiating electromagnetic waves and reception sections for receiving reflected waves of the measurement sections of the radar apparatuses may be provided to a plurality of portions of the own vehicle as shown in FIG. 13, so that the radar apparatuses can measure an object over a wider measurement range. In addition, in the case where the radar apparatus is configured so as to measure an object by using a plurality of measurement sections and one operation section, radiation sections for radiating electromagnetic waves and reception sections for receiving reflected waves of the measurement sections may be provided as shown in FIG. 13, so that the radar apparatus can measure an object over a wider measurement range.

In addition, in another embodiment, the above-described smoothed measured position or mixed measured position may be calculated as a corrected position.

In addition, functions of the operation section 102 and the operation section 301 may be realized by integrated circuits such as LSIs, CPUs, or microcomputers interpreting and executing predetermined program data which is capable of executing steps of processing stored in a storage apparatus (ROM, RAM, hard disc, etc.). Such integrated circuits may be integrated circuits forming an ECU described above provided to a mobile body such as an automobile. In addition, in this case, the program data may be introduced into the storage apparatus via a storage medium, or may be executed directly from the storage medium. Note that the storage medium may be a semiconductor memory such as a ROM, a RAM, or a flash memory, a magnetic disc memory such as a flexible disc or a hard disc, an optical disc memory such as a CD-ROM, a DVD, or a BD, or a memory card.

While the invention has been described in detail, the foregoing description in all aspects is merely an example of the present invention and does not restrict the scope thereof. It is understood that all the above embodiments may be combined in any manner, and that numerous other modifications and variations can be devised without departing from the scope of the invention.

INDUSTRIAL APPLICABILITY

The present invention can reduce the frequency of erroneous determination of a supporting apparatus provided at a subsequent stage, and for example, is useful for a radar apparatus provided to a mobile body such as an automobile.

The invention claimed is:

1. A radar apparatus provided in an own vehicle, the radar apparatus measuring an object, based on a radiated electromagnetic wave and a received reflected wave, the radar apparatus comprising:
   a measurement section for generating measured information indicating a position of the object which has been measured and a relative velocity of the object;
   a contact time calculation section for calculating a contact time that it takes for the own vehicle and the object to come in contact with each other, based on the position and the relative velocity indicated by the measured information;
   a changing section for, based on the contact time, changing a filter coefficient to be used when filter processing is performed on the position indicated by the measured information;
   a filter processing section for calculating a corrected position, based on the position indicated by the measured information, by performing the filter processing, wherein the filter processing is performed, by using the filter coefficient changed by the changing section, on the position indicated by the measured information and a previous corrected position which has been previously calculated by the filter processing being performed on the position; and
   a prediction section for predicting a direction of progression of the object, based on the corrected position,
   wherein the filter processing section calculates the corrected position, based on the position indicated by the measured information, by multiplying both of the position indicated by the measured information, and the corrected position, by a mixing ratio changed as the filter coefficient by the changing section, and summing the resultant values.

2. The radar apparatus according to claim 1, wherein plural types of filter coefficients which change the characteristic of the filter processing with respect to the degree of stability and the degree of responsiveness are set in advance, and the changing section, in changing the filter coefficient, selects one filter coefficient among the plural types of filter coefficients in accordance with the length of the contact time, thereby changing a characteristic of the filter processing.

3. The radar apparatus according to claim 2, wherein the changing section, in changing the filter coefficient, selects a smaller filter coefficient among the plural types of filter coefficients as the contact time becomes shorter, and thereby changes the characteristic so that the degree of responsiveness of the characteristic increases as the contact time becomes shorter.

4. The radar apparatus according to claim 1, wherein the filter processing section includes:
   an estimation section for estimating a position of the object, based on the corrected position and a previous velocity of the object which has been previously calculated; and
   a position correcting section for calculating the corrected position, based on the position indicated by the measured information, by performing the filter processing, wherein the filter processing is performed, by using the filter coefficient changed by the changing section, on the position of the object estimated by the estimation section and the position indicated by the measured information.

5. The radar apparatus according to claim 4, wherein the filter processing section further includes a velocity correcting section for calculating and estimating a velocity of the object by performing the filter processing, wherein the filter processing is performed, by using the filter coefficient changed by the changing section, on the previous velocity of the object which has been previously calculated and an estimated velocity of the object estimated based on the corrected position calculated by the position correcting section.

6. The radar apparatus according to claim 1, wherein the filter processing section includes:
   an estimation section for estimating a position of the object, based on the corrected position and a previous velocity of the object which has been previously calculated;
   a first position correcting section for calculating the corrected position, based on the position indicated by the measured information, by performing the filter processing, wherein the filter processing is performed, by using a predetermined filter coefficient, on the position of the object estimated by the estimation section and the position indicated by the measured information; and
   a second position correcting section for calculating the corrected position, based on the position indicated by the measured information, by multiplying both of the position indicated by the measured information and the corrected position calculated by the first correction section, by a mixing ratio changed as the filter coefficient by the changing section, and summing the resultant values, and the prediction section predicts the direction of progression of the object, based on the corrected position calculated by the second position correcting section.

7. A measurement method executed by a radar apparatus provided in an own vehicle, the radar apparatus measuring an object, based on a radiated electromagnetic wave and a received reflected wave, the measurement method comprising:

a measurement step of generating measured information indicating a position of the object which has been measured and a relative velocity of the object;

a contact time calculation step of calculating a contact time that it takes for the own vehicle and the object to come in contact with each other, based on the position and the relative velocity indicated by the measured information;

a changing step of, based on the contact time, changing a filter coefficient to be used when filter processing is performed on the position indicated by the measured information;

a filter processing step of calculating a corrected position, based on the position indicated by the measured information, by performing the filter processing, wherein the filter processing is performed, by using the filter coefficient changed in the changing step, on the position indicated by the measured information and a previous corrected position which has been previously calculated by the filter processing being performed on the position; and a prediction step of predicting a direction of progression of the object, based on the corrected position, wherein in the filter processing step, the corrected position is calculated based on the position indicated by the measured information, by multiplying both of the position indicated by the measured information, and the corrected position, by a mixing ratio changed as the filter coefficient in the changing step, and summing the resultant values.

* * * * *